United States Patent [19]
Barlow et al.

[11] Patent Number: 6,048,954
[45] Date of Patent: Apr. 11, 2000

[54] BINDER COMPOSITIONS FOR LASER SINTERING PROCESSES

[75] Inventors: Joel W. Barlow; Neal K. Vail, both of Austin, Tex.

[73] Assignee: The University of Texas System Board of Regents, Austin, Tex.

[21] Appl. No.: 08/879,688

[22] Filed: Jun. 24, 1997

Related U.S. Application Data

[63] Continuation of application No. 08/279,235, Jul. 22, 1994, abandoned.

[51] Int. Cl.$^7$ .................................................. C08F 220/10
[52] U.S. Cl. .................................. 526/328.5; 526/329.7
[58] Field of Search ............................. 526/329.7, 328.5

[56] References Cited

U.S. PATENT DOCUMENTS

| | | | |
|---|---|---|---|
| 3,110,702 | 11/1963 | Delacvetaz | 526/209 |
| 3,222,328 | 12/1965 | La Comlee et al. | 526/224 |
| 4,041,194 | 8/1977 | Jenkins | 427/226 |
| 4,728,701 | 3/1988 | Jarvis et al. | 526/65 |
| 4,863,538 | 9/1989 | Deckard | 156/62.2 |
| 4,938,816 | 7/1990 | Beaman et al. | 156/62.2 |
| 4,994,817 | 2/1991 | Munson et al. | 343/770 |
| 5,017,753 | 5/1991 | Deckard | 219/121.63 |
| 5,076,869 | 12/1991 | Bourell et al. | 156/62.2 |
| 5,147,587 | 9/1992 | Marcus et al. | 264/22 |
| 5,156,697 | 10/1992 | Bourell et al. | 156/62.2 |
| 5,182,170 | 1/1993 | Marcus et al. | 428/551 |
| 5,284,695 | 2/1994 | Balow et al. | 428/206 |
| 5,420,218 | 5/1995 | Toribuchi et al. | 526/214 |
| 5,483,016 | 1/1996 | Aoki et al. | 526/318.45 |

OTHER PUBLICATIONS

Baird, "Xerographic materials," *Encyclopedia of Polymer Science and Engineering*, vol. 17, John Wiley & Sons, New York, pp. 918–943, 1989.

Kumar and Gupta, "Emulsion polymerization," *Fundamentals of Polymers*, The McGraw–Hill Companies, Inc. New York, 1998, Chapter 7.

Madorsky, *Thermal Degradation of Organic Polymers*, Interscience Publishers, New York, 1964, pp. 42–43, 82–83, 88–91, 98–101, 112–113, 118–119, 144–145, 150–151, 160–161, 188–193, 295–303.

Rodriguez, *Principles of Polymer Systems*, 4th Ed., Taylor & Francis Publishers, 1996, pp. 170–173.

Ashley, S., "Rapid Prototyping Systems", *Mechanical Engineering*, 34–43, Apr. 1991.

Badrinarayan, B., et al., "Metal Parts From Selective Laser Sintering of Metal–Polymer Powders", Solid Freeform Fabrication Symposium Proceedings, 3:141–146, 1992.

Badrinarayan, B., et al., "Selective Lawer Sintering of a Coopper–PMMA System", Solid Freeform Fabrication Symposium Proceedings, 4:245–250, 1993.

Bourell, D.L., et al., "Solid Freeform Fabrication An Advanced Manufacturing Approach", Solid Freeform Fabrication Symposium Proceedings, 1:1–7, 1990.

Graessley, W.W., et al., "The Shear–Rate Dependence of Viscosity in Concentated Solutions of Narrow–Distribution Polystyrene", *Transactions of the Society of Rheology*, 11:3, 267–285, 1967.

Nelson, J.C., et al., "Laser Sintering Model for Composite Materials", Solid Freeform Fabrication Symposium Proceedings, University of Texas, Austin, Texas, 4:360–369, 1993.

Sanayei, R.A., et al., "Catalytic Chain–Transfer in Polymerization of Methyl Methacrylate. I. Chain–Length Dependence of Chain–Transfer Coefficient", *J. Macro. Sci.–Chem.*, A26(8):1137–1149, 1989.

Urquhart, A.W., "Molten Metals Sire MMCs, CMCs", *Advanced Materials and Processses*, 7:25–29, 1991.

Vail, N.K., et al., "Effect of Polymer Coatings as Intermediate Binders on Sintering of Ceramic Parts", Solid Freeform Fabrication Symposium, The University of Texas: Austin, Texas, 2:195–204, 1991.

Vail, N.K., et al., "Development of a Poly(Methyl Methacrylate–co–n–Butyl Methacrylate) Copolymer Binder System", *J. of Applied Polymer Sci.*, 52:789–812, 1994.

Zong, G., et al., "Direct Selective Laser Sintering of High Temperature Materials", Solid Freeform Fabrication Symposium Proceedings, The University of Texas, Austin, Texas, 3:72–85, 1992.

DC Blackley, Emulsion Polymerization, Wiley, New York, 1975, pp. 14–15.

PLASPEC database AN 400–4074, 400–4071, and 400–1159; AN 400–16884, 400–16879, and 400–16874.

Braudrup and Numergut, Eds, Polymer Handbook, 2d Ed., Wiley, New York, 1975, pp. II–475 and III–150.

Hawley's Condensed Chemical Dictionary, 11$^{th}$ Ed., Van Nostrand Reinhold, New York, 1987, 928.

*Primary Examiner*—Bernard Lipman
*Attorney, Agent, or Firm*—Arnold, White & Durkee

[57] ABSTRACT

The development of polymer binder compositions that provide novel binders for high temperature inorganic particulates, especially metal and ceramic particulates is described. These materials are especially useful in a laser beam sintering process known as SLS™ that forms accurately shaped high strength green objects. The new binders may be thermally removed in post-shaping operations without significant residual ash. The resulting structures contain only metal, ceramic, or metal ceramic materials. The inventive methods developed for producing the new polymeric binder materials are based in part on using emulsion forms of selected polymers at controlled low molecular weights and high melt flow. An important aspect of the process is the semi-batch addition of selected chain transfer agents to the reacting emulsion. This optimizes coating characteristics of the polymer binder and results in high part strengths of the prototype parts produced in the SLS™ process.

21 Claims, 10 Drawing Sheets

BINDER COMPOSITIONS FOR LASER SINTERING PROCESSES

This application is a continuation of application Ser. No. 08/279,235, filed Jul. 22, 1994, abandoned.

The U.S. Government owns rights in the present invention pursuant to DARPA-ONR grant N0001492J1394

BACKGROUND OF THE INVENTION

1. Field of the Invention

The present invention relates to novel polymeric binder compositions useful in the prototyping of metal and ceramic parts. Methods of binder preparation and processes for producing all-metal or all-ceramic prototype or test parts by laser sintering technology are also part of the invention.

2. Description of the Related Art

Rapid prototyping of parts for machinery and manufacturing processes is important in development and testing of improved designs and new fabrications. In general, a thermally fusible substrate, such as a wax or plastic, is shaped to a desired form.

In the case where the substrate is not a thermally fusible material, such as metal or ceramic, the substrate is mixed with a thermoplastic binder material. This substrate/binder is shaped to a desired form, which is known in the field as a green part. When the binder is removed, typically by heating, the resulting metal or ceramic prototype will maintain the basic shape characteristics of the green part. Additional post-processing steps may then be employed to increase the strength and modulus of the green part.

Several processes are available for the fabrication of solid objects (Bourell et al., 1990, Ashley, 1991), including the Soligen™ and Selective Laser Sintering™ (SLS™) process (Deckard, 1986, Deckard, 1988).

Each may employ substrate powders combined with "fugitive" thermoplastic binders. The composites are shaped into component parts, then heated to remove the binder, thus producing a part free of binder material.

An efficient method for coating the inorganic particles with a binder is important for obtaining a green part with a high green strength (Vail and Barlow, 1991). Generally, this is accomplished if the binder is soluble in an easily vaporized carrier media. Water, as well as several organic solvents, can be used for this purpose (Masters, 1985). Removal of the binder subsequent to shaping of the green part must be accomplished with minimal residue; otherwise, the integrity of the substrate material may not be maintained. Many binders leave significant residues when vaporized and therefore are not suitable for preparation of accurately proportioned prototype parts obtained from green parts.

Some current methods of preparing parts from high temperature materials are described in U.S. Pat. No. 5,182,170. Several processes, including sandcasting and injection molding, have been used to produce solid objects from a three-dimensional model or mold. Another method for rapid preparation of thermoplastic parts and wax patterns for lost wax castings employs a laser to create a solid object from model parameters stored in a CAD data base. Green parts are produced by successive deposition and laser sintering of thin layers of thermo-fusible materials. A laser sintering method, known as SLS™ is described in U.S. Pat. Nos. 5,076,869, 5,076,869, 4,863,538, 5,017,753, and U.S. Pat. No. 4,938, 816, all incorporated herein by reference. In commercial applications of SLS™, a low power, raster scanned modulated $CO_2$ laser is employed to selectively sinter thermoplastic powders in accordance with computer information about the object cross-section from a data base.

However, the low laser power and consequently low achievable powder fusion temperatures employed in this commercial process prevent the use of existing technology for directly fusing metal and ceramic powders that have high softening, sintering or melting temperatures (Zong et al., 1992). Present laser sintering technology is limited to preparing parts from powdered waxes and thermoplastic materials such as nylon, polycarbonate ABS and the like as described in U.S. Pat. No. 5,156,697 and U.S. Pat. No. 5,147,587, incorporated herein by reference. Current technology has failed to provide suitable fugitive binders for use with ceramic and metal powders in laser sintering processes. Consequently, access to hard, durable metal or ceramic parts through rapid prototyping processes such as SLS™ is not available.

Therefore there exists a need to develop rapid prototyping methods for preparing metal, ceramic and ceramic-metal composite parts. Such methods would likely result in a significant lowering of design costs by comparison with less practical methods of making such parts for design and test purposes.

SUMMARY OF THE INVENTION

The present invention addresses the foregoing and other problems disclosed in the prior art by providing novel polymeric binder compositions particularly adapted to formulation of free flowing metal/binder and ceramic/binder composite powders. The powders are suitable for production of metal and ceramic computer-modeled prototype and test parts from processes such as selective laser sintering. Green parts produced in this manner are post processed to be substantially free of binder. The invention for the first time allows metal or ceramic parts to be produced by the low power lasers used in the laser sintering process. While referred to as prototype parts, such parts may in fact be used in testing procedures; for example, to test new designs and new types of machine parts.

The all metal, ceramic or metal/ceramic parts provided by the disclosed methods overcome disadvantages of wax or plastic parts, such as lack of durability and dissimilarity in performance to ultimately used part composition.

The invention includes novel binder compositions, methods of preparing such compositions, novel metal and ceramic powder compositions and methods of using the novel binder coated metal and ceramic particles composites to produce prototype parts.

The novel polymeric material compositions described herein have been developed as thermoplastic binders for both metal and ceramic particles. The polymeric binders are readily removed from metal or ceramic compositions by thermal decomposition in either oxidizing or reducing atmospheres to produce parts that contain only metal, only ceramic or only metal/ceramic materials. In general the binders are amorphous and polymeric. They are polymers, copolymers or terpolymers with glass transition temperatures above 40° C., and have a melt flow index between about 1 to about 50 g/10 min. at 200° C. and 75 psi extrusion pressure, using the instrument geometry and testing protocols described in ASTM # D1238. The polymers have alternately placed quaternary carbons on the polymer backbone which permits thermal depolymerization to gaseous products without substantial molecular degradation at temperatures below thermal scission. There are several classes of monomers that may be used to make amorphous polymeric binder compositions with the described properties, including monomers of PTFE, propylene, isobutylene, α-methylstyrene and the like. Preferred polymer binder compositions include methyl methacrylate and butyl methacrylate. Methyl methacrylate/n-butyl methacrylate is particularly preferred as a copolymer.

The polymeric binder compositions developed by the inventors may be employed to mix with, or to coat metal or ceramic particles to produce free-flowing powders with flow characteristics independent of relative humidity. The disclosed binders are different from water soluble binders and slip aids used in conventional ceramics processes in which the binder coated powder is compressed to a shape prior to furnace treatment to remove the polymer and thermally consolidate the ceramic (German, 1990). Such compression is not used in selective laser sintering processing; therefore, it is important that coated powders for SLS™ and similar type processing be free flowing at processing conditions.

Additionally, and in a practical sense, water immiscibility of the polymer binder is important, particularly in applications where all-ceramic or all-metal parts are desired. If the binder is too hydroscopic, excess water will create steam during the process. This interferes with or prevents fusion of the binder and substrate into a useful green part. In some current methods of producing prototype parts, water-borne ceramic cementing agents are infiltrated into a polymer bound part previously shaped by laser sintering. The cementing agent is dried and set and the polymer burned out to produce an all-ceramic part. This method of post SLS™ processing has been used to produce ceramic parts and is described in U.S. Pat. No. 5,284,695 incorporated herein by reference. The binder compositions of the present invention are used during the laser sintering process, not subsequent to processing. Therefore, the disclosed binder compositions are an important factor in practicing laser sintering methods.

Particularly preferred polymeric binders include those formed from 1,1-disubstituted vinyl monomers such as esters and amides of methacrylic acid and its derivatives. Examples of 1,1-disubstituted vinyl monomers include methacrylic acid, dimethylamino ethylmethacrylate and methacrylamide, methyl methacrylate and butyl methacrylate. The polymers formed from these monomers are particularly preferred because the major thermal decomposition route is depolymerization to gaseous products in both oxidizing and reducing atmospheres, largely eliminating problems with residual ash.

Decomposition of the polymeric binder material is important because in processes used to produce prototype parts, it is desirable to remove the binder material so that all-metal or all-ceramic parts are obtained. Generally, most organic polymeric binders may be oxidized to carbon dioxide and water in the high temperature furnaces normally used to "fire" or sinter ceramics. Likewise, in similar processes for producing metal is parts, almost any polymeric binder can be used as a binder, provided that the furnace is operated under oxidizing conditions. The polymer is oxidized to gaseous products, largely comprising $CO_2$ and $H_2O$. Any metal oxides formed during the previous step must then be reduced. This type of approach is generally used when polypropylene, polyethylene or wax binders are removed from green parts made by powder injection molding. A disadvantage of this process is the extra furnace processing time required to reduce the metal oxides. Additionally, metal powder parts may swell due to oxide formation, leading to unexpected changes in part dimensions. These problems are avoided with the novel polymeric binders described herein because the binders may be removed efficiently in a reducing atmosphere. This eliminates the need for further processing since no metal oxides are formed.

The binder materials disclosed in the present invention decompose to gaseous products in a reducing atmosphere, typically hydrogen. In general, lack of oxidizing agents such as oxygen limits the high temperature decomposition to three pathways. These paths include (i) sequential elimination of chemical side groups in the polymer chain; (ii) random scission of the polymer chain; and (iii) depolymerization of the chain to form monomer. The first two paths invariably form graphitic carbon structures as the noncarbon species comprising the molecule are thermally stripped. Polymers that decompose by these paths leave behind an undesirable ash or conjugated carbon contaminant in the metal structure that can cause losses in mechanical properties of the sintered part. By selecting polymers that have a quaternary carbon atom alternately located in the backbone, the major thermal decomposition route is limited to depolymerization. The 1,1-disubstituted vinyl monomers previously discussed are particularly suitable for this purpose and include (poly) α-methylstyrene as well as polymers and copolymers of methacrylic acid, ester, amide, anhydride and imide derivatives of methacrylic acid. The amorphous polymeric binders need not be entirely limited to these compositions. Small amounts of other substances may be added to the binder compositions. For example, chemically similar compounds that do not have the requisite structure for depolymerization may be included to enhance adhesion and other desirable properties, provided these monomers make up less than about 10 mole percent of the copolymer composition. Typically, this will amount to only a few percent, e.g., 3–5%, depending on the particular polymer and the desired purpose.

The invention also includes inorganic substrates coated with the disclosed binders. When applied to inorganic particles, the binders form free flowing powders of binder coated particulates. The coated particles provide excellent substrates for producing ceramic or metal prototype parts in laser sintering processes. For the first time, binder coated ceramic and metal particulates useful as substrates in the SLS™ process are available. The binder coated ceramic and metal powders are readily handled, conveniently shipped and may be stored for long periods of time without the separation of components sometimes encountered when using mixed powders. More importantly, one may readily produce green parts that can be post-processed to all metal, all ceramic or all metal/ceramic parts.

Yet another aspect of the invention includes methods of coating metal and ceramic particulates to provide free flowing powders with optimal properties for processing into shapes by laser sintering processes. It is important that the polymer be distributed so as to cover as much of the surface of the particulate as possible. In principle, this could be accomplished by dissolving the polymer in a suitable organic solvent to achieve a low concentration of the polymer, depositing the solution on the surface of the particulate then evaporating the solvent. However, this process has the disadvantage of solvent recovery costs as well as potential environmental harm associated with use of organic solvents. To avoid this problem, the amorphous polymeric binders preferably are prepared by emulsion polymerization. In this technique, liquid monomers are emulsified in water, generally with the aid of an appropriate emulsifying agent. Water soluble ionic initiators are typically incorporated to polymerize the monomer to form an emulsified polymer. Typical emulsion particles are quite small, about 100 nm ($4 \times 10^{-6}$ in) in diameter so that the polymer is well distributed throughout the water vehicle with typical concentrations in the range of 2–5×10$^{14}$ particles per cubic centimeter, and the emulsion is mechanically stable to the effects of gravity.

Emulsion polymerization is a generally well known technique that typically produces high molecular weight products at high polymerization rates. It is important that the polymer coating for the particles used in sintering processes be rigid and nontacky at room temperature. This prevents "blocking" or premature fusing of the polymer coated powder during storage. This also provides structural permanence, i.e., low creep rates and low flexibility at room temperature to composite green parts made by laser sintering processes. This differs from the requirements for water-based paint formulations in which particles of the emulsion polymer fuse together at ordinary temperatures to form a flexible protective film.

The inventors have determined that the polymer binder must soften and flow at temperatures between 40° C. and 100° C. The polymer's fusion temperature is a function of its molecular constituents. This temperature is defined as the polymer glass transition temperature, $T_g$, if the polymer is amorphous or by its melting temperature, $T_m$, if it is semi-crystalline. The inventors have determined that it is important that the polymer constituents for the new binder compositions have $T_g$s above 40° C. This contrasts with typical paint formulations that have $T_g$s near −20° C.

Surprisingly, the inventors have discovered that strengths of prototype green parts prepared from binder coated particles in accordance with the present invention exhibit increased strength with increasing melt flow of the copolymer binder. The strengths approach a maximum near a melt flow index where the strength of the cast pure polymer is falling from its high molecular weight plateau value. This is an unexpected and counterintuitive result. Most theories of composites would predict that for well adhered systems, the strength should be the sum of the fraction weighted constituents. The inventors have found that use of the melt flow index is a convenient method of determining which binder materials are suitable; thus, binder melt relaxation time constants appropriate for laser sintering processes and particle coating operations may be qualitatively assessed by using the melt flow index of a polymer material. In general, certain equations will describe sets of relaxation time constants for polymers.

Polymer relaxation time constants relate to dynamic deformations and internal stresses and provide quantitative data on the rate at which polymer can flow and creep. Noting that the low shear rate viscosity, $\eta_0$, is proportional to the inverse of the molecular weight raised to the 3.4 power, the inventors used the ASTM #D1238 low shear rate capillary rheometer or melt index apparatus to measure extrusion rates. The inventors determined that extrusion rates for polymers in the range of 1–50 g/10 min at 200° C. and 75 psi extrusion pressure, and $T_g$ are useful to identify materials that process well in laser sintering processes to produce green parts of high bending strengths.

The inventors have found that certain sized coated particulates are preferred in selective laser sintering processes. Particles with diameters greater than about 2 μm will spread, level and sinter well in the SLS™ process. Particles as large as 200 μm can be processed, depending on the thickness of the powder layer employed in the SLS™ process. However, dimensional accuracy and surface finish will be limited when larger particles are used. Particles with diameters smaller than 2 μm result in low bed densities as well as powder spreading and sheer problems. The size of the coated particle is also important for edge definition, which is a factor in determining overall surface quality. For most purposes, when metal or ceramic prototype or test parts are desired, preferred particulate sizes are in the range of about 4 to about 75 μm; however, a range of about 5 to about 20 micrometers is suitable for most applications. The disclosed binder materials may be used to coat virtually any inorganic substrate; however, the binders are particularly suited for coating of metal or ceramic particulates.

Methods of preparing free flowing sinterable binder coated ceramic or metal powders are also within the scope of the invention. Generally, an aqueous emulsion of a thermally depolymerizable polymer that has a melt flow index between about 1 to about 50 grams per 10 min at 200° C. and 75 psi extrusion pressure is produced. Coating a metal or ceramic particulate with the emulsion polymer binder results in a free flowing sinterable metal or ceramic composite powder.

The invention further includes synthetic methods to produce emulsified amorphous polymer binders. A controlled molecular weight with high melt flow is achieved using an appropriate chain transfer agent. Many of several chain transfer agents are suitable but should be selected to result in polymers having a melt flow index between about 1 to about 50 grams per 10 min at 200° C. and 75 psi extrusion pressure. The molecular weight is controlled by the efficiency of the chain transfer agent and by the concentration of chain transfer agent used. Chain transfer coefficients ($C_s$) may be determined from well known equations relating chain transfer agent concentration to monomer concentrations (Bovey, 1955, incorporated herein by reference).

Generally, chain transfer agents with $C_s$ coefficients much less than one are not suitable because these materials are not completely consumed during the polymerization, due in part to requiring greater starting concentrations to achieve a desired molecular weight. On the other hand, a chain transfer reagent with a chain transfer coefficient much greater than one is completely consumed before total conversion of the monomer to a suitable molecular weight. Therefore, a $C_s$ coefficient of about one is desirable to assure that monomer and the chain transfer reagent are consumed at approximately the same rate.

Chain transfer reagents suitable for producing amorphous polymeric binders appropriate for coating metal and ceramic particulates include, n-butyl-3-mercaptopropionate, iso-octyl-3-mercaptopropionate, thiophenol, and t-dodecylmercaptan. These chain transfer agents are particularly preferred for polymerization of methacrylic acid esters. The inventors have found that chain transfer coefficients ranging from about 0.5 to 1.5, preferably about 1.0, are associated with preferred chain transfer agents, although higher or lower values do not necessarily preclude use. Preferably, the chain transfer constant should be relatively high, i.e., above about 0.5. Preferably, the chain transfer reagent is metered to the reaction mixture to insure proper molecular weight control, particularly when employing the more efficient chain transfer agents.

Copolymer or polymer emulsions to provide the binder compositions of the present invention may be prepared by batch or semi-batch processes. These procedures have been demonstrated for preparation of copolymers and terpolymers of methylacrylic acid esters. Both synthesis methods react substantially all of the monomer to completion. In principle, batch and semi-batch procedures are straightforward and many variations of these are used in commercial manufacturing processes.

Batch polymerization procedures where all ingredients are initially charged to the reactor become disadvantageous at large batch reactor volumes unless special heat exchange capabilities are provided due to the strongly exothermic nature of the reaction in the latter stages of polymerization. This exotherm may be caused by a decrease in the termination rate which results in a Trommsdorf type instability in the polymerization. Regardless of the mechanism for the exothermic properties, a decrease in chain termination rate may have the undesirable side effect of increasing the viscosity of the polymer formed in the latter stages of polymerization.

In the semi-batch method, it is preferable to add the monomer and chain transfer reaction agent to the emulsion in a semi-batch manner. This provides better control of reactor temperature in large reactors, a correspondingly longer reaction time, a lower viscosity product, and compositional control. In addition to the obvious reactor stability issues, slowing the polymerization rate is also advantageous insofar as it can provide a lower molecular weight, lower viscosity product at the same or lower addition of chain transfer agent requirement for batch polymerization.

While either batch or semi-batch polymerization methods may be used, semi-batch polymerization is preferred because it tends to lead to binder materials with lower ash contents due to the lower concentration of chain transfer agent required.

As discussed, metal or ceramic particulates of the appropriate size are coated with the emulsified polymeric binder. Typically, the emulsion polymer is about 40% polymer and is mixed with metal or organic particles to form a slurry that will contain about 10–30 volume percent polymer when dried. Suspension aids may be added to retard settling by increasing the viscosity of the slurry. Suspension aids are typically water soluble, high molecular weight materials such as xanthan gum, carrageenan, Vistac™ and the like.

Numerous particle coating techniques are available and any of several choices are appropriate for coating metal or ceramic particles with the disclosed binders. One coating technique employs a polymer binder slurry. A particulate, e.g., metal, ceramic or ceramic metal combination, is spray dried in a standard NIRO spray dryer equipped with a centrifugal atomizer wheel. A properly operated atomizer flings out slurry particles of about 50 $\mu$m in diameter and effectively coats the metal or ceramic particulates.

The fluidized bed technique may be used for particles with sizes ranging from less than 1 $\mu$m to about 2.5 in. Generally, particles in the size range of 10–210 $\mu$m are best suited for fluidization. Larger particles are subject to instabilities leading to surges within the bed while finer particles are affected by interparticle cohesive forces which spoil the fluidization. However, fine particles added to coarse particles aid fluidization and the converse is also true. When used as a coating process, fluidization of the particles is established prior to introducing the coating agent. Typically the agent is water soluble and dilute to avoid instant tackifying although, emulsion polymers such as those described herein may be coated by this method. The fluid can be injected directly into the particles or at a point within the fluidizing gas upstream of the bed. Fairly uniform coatings by thermoplastic materials can be achieved if the bed media is heated. (Leva, 1959, Vanecek et al., 1966)

Other coating techniques may be used, including air suspension and centrifugal multiorifice coating techniques. Alternatively, one may use simple mixing techniques to combine the inorganic particles with the particulate polymeric binder prior to forming the green part. Numerous coating techniques have been described in the literature. (Kondo, 1979)

In yet another aspect of the invention, methods of preparing all-metal or all-ceramic parts are disclosed. These parts are prepared by fusing particles coated with the novel polymeric binders so as to form a part of the desired shape. The binder is then removed, typically by heating the shaped parts in either an oxidizing or reducing atmosphere. For metal parts, removal of the binder in a reducing atmosphere is preferred because no metal oxides are formed, thus eliminating the need for further processing. More importantly, without metal oxidation, there is no swelling that may lead to deformation of metal parts.

In some cases, it will not be necessary to remove the binder; for example, when a three dimensional model of a part is desired only for visual effect, i.e., for design visualization. In such cases, green parts may be produced in short periods of time, resulting in significant savings due to rapid production and lower labor cost.

As mentioned, the composite powders of the present invention are particularly suitable for laser sintering processes; however, the novel binder compositions are also useful in other processes for forming shaped parts. Examples include mold baking or injection molding, pressing or hot pressing. In these processes, the binders are readily removed by thermal composition, as in laser sintering processes. Removal is preferably conducted in a reducing atmosphere when metal prototype parts are desired to prevent metal oxidation; otherwise, where oxidation is not a problem, in a normal atmosphere. At the present time, hydrogen is used for the reducing atmosphere, although other reducing atmospheres could be employed.

Metal parts may be produced from virtually any metal. The d and f transition series metals are preferred. Metals of the first transition series, including Ti, V, Cr, Mn, Fe, Co, Ni, and Cu, as well as Zn and Al are particularly preferred. Mixed metals may also be employed, including steel, aluminum alloys, tungsten alloys and titanium alloys. The method is equally adaptable to production of ceramic parts made of silica, silicon carbide, alumina, silicon nitrate, sodium nitride and soda lime glass. Metal ceramic combinations are also contemplated to be readily obtained; for example, silicon carbide/aluminum, titanium carbide/cobalt, and others listed in Urquhart, 1991.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE PREFERRED EMBODIMENTS

Figure 1:
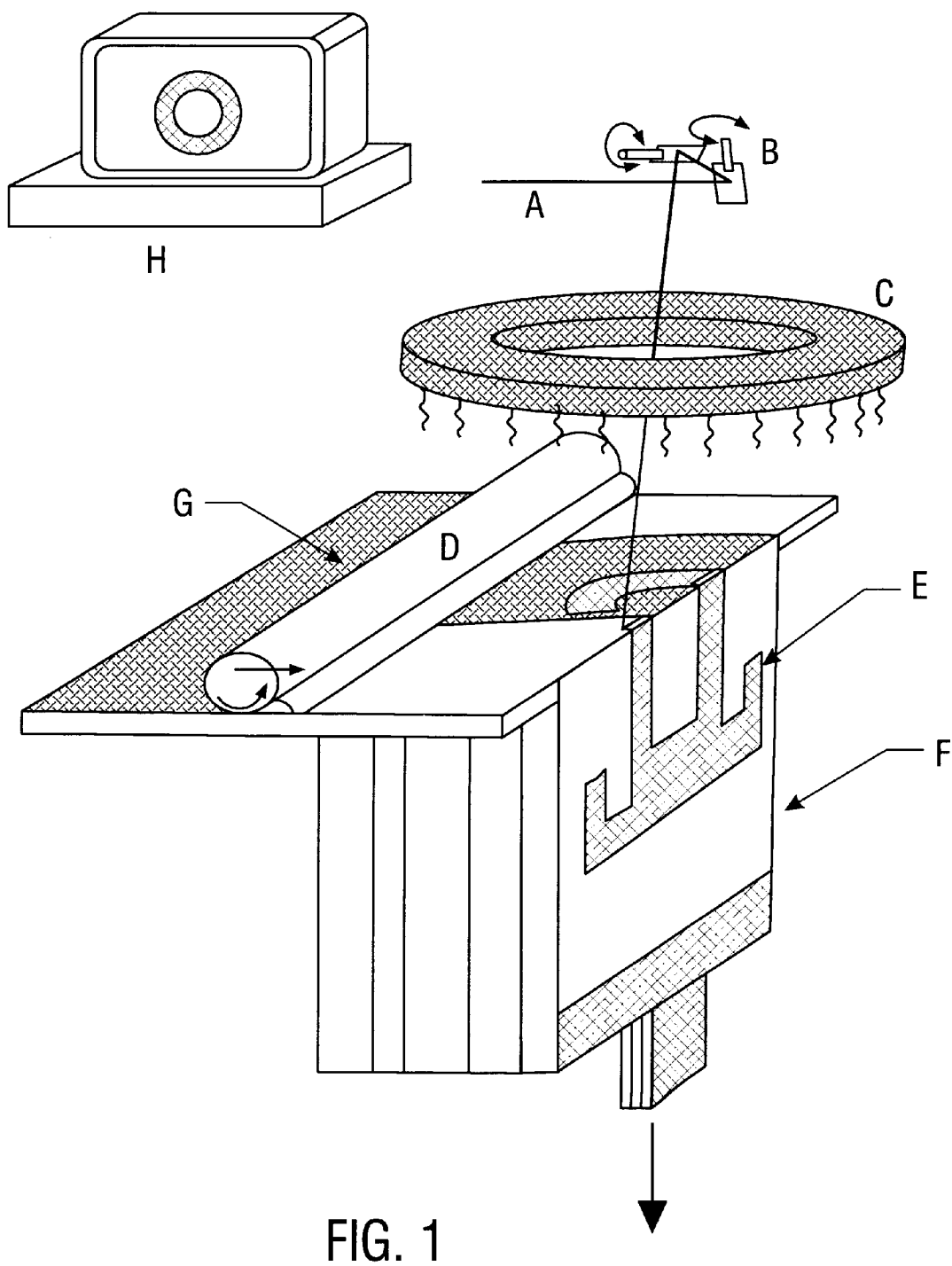
FIG. 1 is a diagram showing a typical apparatus used in the selective laser sintering process. H is a computer control for the laser source, A, focused by the mirrors, B. Heating is provided by a radiant heater, C. D is the leveling mechanism for F, the powder bed. G is the new layer being added to E, the part being produced.

The inventors have identified several key properties required for binders suitable for use with metal and ceramic particles. By developing methods to produce binders having these properties, the inventors have produced new polymer composites particularly useful in the fabrication of green parts by selective laser sintering and other techniques.

Many polymers can be made by a technique known as emulsion polymerization. In this technique, liquid monomers are emulsified in water with the aid of an appropriate emulsifying agent. Water-borne, ionic initiators are incorporated to polymerize the monomer, thereby forming the desired emulsified polymer. Emulsion particles are typically quite small, about 100 nm ($4 \times 10^{-6}$ in) in diameter, so that the polymer is well distributed throughout the water vehicle with concentrations in the range of $2-5 \times 10^{14}$ particles per cubic centimeter (Bovey et al., 1955). Such emulsions are mechanically stable to the effects of gravity. Emulsion polymerization is generally known to produce high molecular weight products at high polymerization rates and is the method of choice for preparing the polymer binder commonly used in water-based acrylic paint systems.

Despite the similarity of some of the ingredients and method of manufacture, the novel polymer binders described herein are distinctly different from water-based acrylic paint formulations in several ways. To be effective in green part production and subsequent binder removal, the polymer binder must soften and flow at temperatures between 40° C. and 100° C. Additionally, the polymer coating should be rigid and non-tacky at room temperature. This prevents "blocking" or premature fusing of the polymer-coated powder during storage and provides some structural permanence (low creep rates and low flexibility at ambient temperature) to composite parts made from this powder. Paint formulations, on the other hand, require that the particles of emulsion polymer fuse together at room temperature range to form a flexible protective film.

The polymer's fusion temperature is a function of its molecular constituents. This temperature is characterized by the polymer's glass transition temperature, $T_g$, if the polymer is amorphous, or by its melting temperature, $T_m$, if it is semi-crystalline. The new compositions developed by the inventors are prepared from water based emulsions. This places a limit on the number of molecular constituents that are useful to give an amorphous polymer with a $T_g$ in the desired range. An upper limit of 100° C. for the softening temperature is set by the normal boiling point of the water vehicle in the emulsion. Regardless of the process used for coating the inorganic particles with polymer binder, the surface temperature of the particle will be limited to 100° C. as long as a water film is present. The lower limit of the softening temperature is set to about 40° C. to prevent blocking and creeping at ambient temperatures. This contrasts with typical paint formulations that have $T_g$s near −20° C.

To prevent "fines" that can cause powder spreading problems in the laser sintering processes, it is desirable for polymer flow, film formation, and wetting of the inorganic surface to occur simultaneously with water evaporation. This cannot occur if the binder softening temperature greatly exceeds the normal boiling point of water.

Regardless of the polymer or copolymer composition used for the binder, the green strength and agglomerate morphology are related to the binder's ability to rapidly wet the inorganic particle during the coating process. The inventors developed synthetic methods to produce these polymeric binders in emulsion form at controlled viscosity. The viscosity and the related melt flow index, are held in the desired range by the addition of chain transfer agents to the polymerization reactions. The lower viscosity material will have an increased melt flow index, near 30 g/10 min at 200° C. and 75 psi, to optimize the coating characteristics of the polymer binder and the subsequent strength of the green part.

FIG. 1 illustrates an apparatus employed in selective laser sintering. The apparatus includes A; laser source, B; mirrors, C; radiant heater, D; leveling mechanism, E; part being produced, F; powder bed, G; new layer and H; computer control. The type of laser used is dependent on many factors, and in particular the type of powder that is to be sintered. A 25 wattage $CO_2$ laser, typically used to sinter waxes and plastics, may be used to sinter the powders of the present application. The laser beam output of the laser has a wavelength of 10.60 microns, which is near infrared. In the continuous mode, the laser can be modulated on or off to selectively produce a laser beam which travels along a specified path. In this manner, the directed laser beam selectively sinters the powder in the target area to produce the desired sintered layer with the defined boundaries of the desired cross sectional region. This process is repeated layer-by-layer with the individual layers sintered together to form the green part as shown.

Certain binder and binder coating systems will produce a coated particulate that is optimal in size for best performance in the SLS™ process. Particles with diameters from 5 $\mu$m to 25 $\mu$m are found to spread, level, and sinter well. Depending on the thickness of the powder layer employed, particles as large as 200 $\mu$m can be processed. Lowered bed densities and powder spreading and shear problems result when particles with diameters smaller than 2 $\mu$m are attempted.

The disclosed emulsion polymer binders (typically 40% polymer) are mixed with metal or organic particles to produce a slurry that will contain 5–40 vol % polymer when dried. A small amount, typically <1% of the emulsion, of high molecular weight, water-soluble polymer may be added as a suspension aid to help suspend the inorganic particles that are typically 2–150 $\mu$m. Typical viscosity of the slurry is kept low, approximately 10–100 poise at room temperature, to facilitate spraying of the slurry.

Figure 2A:
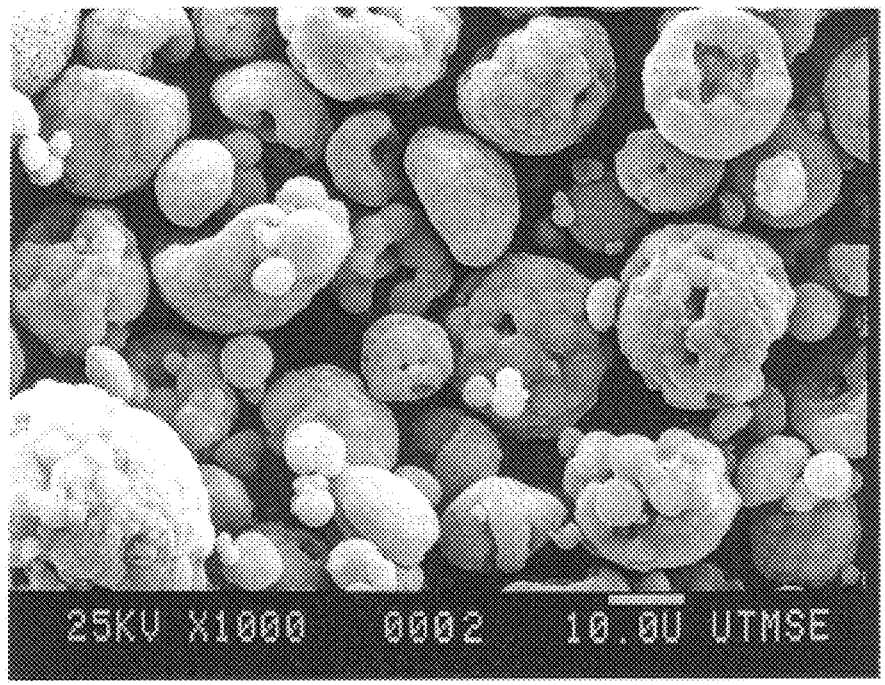
FIG. 2A is a photograph showing the agglomerates formed from glass particulates spray coated with the polymer binder emulsions of the present invention.
Figure 2B:
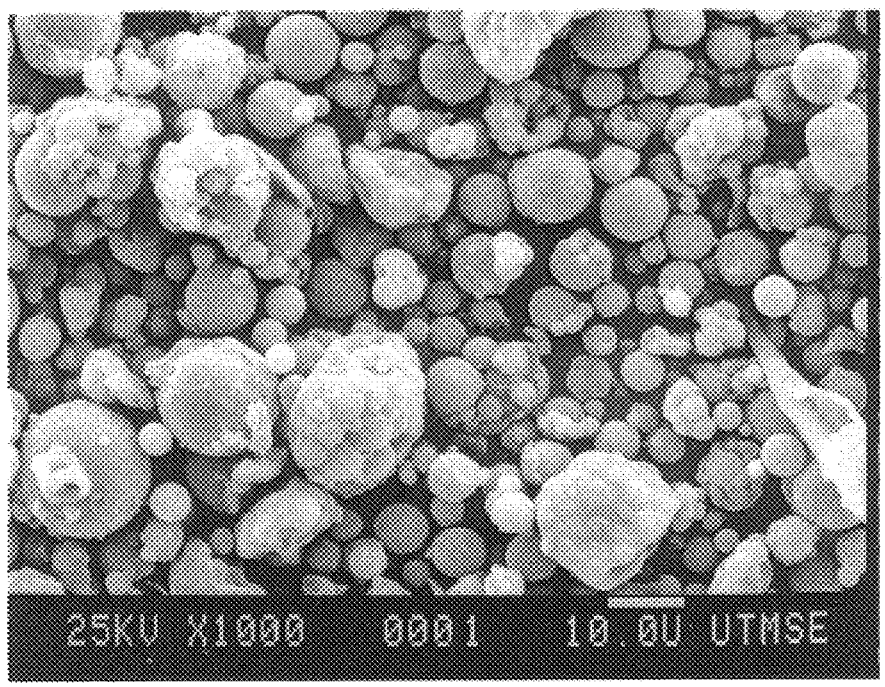
FIG. 2B is a photograph showing agglomerates formed from glass particulates spray coated with polymer binder emulsions that have high binder viscosity at the spray processing temperature.

In one example of a preferred coating technique, the slurry of polymer binder emulsion and particulate is spray-dried in a standard NIRO spray drier equipped with a centrifugal atomizer wheel (Vail and Barlow, 1991). The wheel is usually operated at 35,000 rpm causing a fine mist of the slurry mixture to be slung out into a hot air stream. The water in the mist rapidly evaporates to produce solid particles. Particle size in the range of about 25–50 $\mu$m in diameter is preferred. However, by varying the conditions of the spray drying, for example temperature, feed compositions and atomizer wheel speeds, one can adjust to particle size in either direction (Lefebvre, 1989). The particles obtained are agglomerates of polymer and particulate, see FIG. 2A. An improperly processed slurry, e.g., where the exit air temperature of the dryer is too low relative to the polymer fusion temperature or where the binder viscosity is too high at the processing temperature employed, may produce a large quantity of smaller, non-agglomerated particles such as shown in FIG. 2B.

Smaller, non-agglomerated particles do not spread and level as well as the larger agglomerates in the laser sintering processes. For this reason, the $T_g$ or $T_m$ of the polymer binder should be at least 10° C., preferably 15° C. or more, below the exit air temperature of the dryer. Many dryers are operated so that the exit air temperature is near 100–110° C., and for such dryers and drying operations a $T_g$ or $T_m$ below 80–90° C. is preferred.

Another preferred coating technique utilizes a fluidized bed dryer that coats the particulate by fluidizing it in a heated gas stream, then spraying the polymer emulsion into the fluidized bed of particles. This coating technique also works well with the disclosed emulsion polymer binders to give uniformly coated, metal particles. Generally, a properly designed binder system may be used in a variety of coating systems so long as such systems incorporate evaporation of the water vehicle near the normal boiling point of water.

Binder melt relaxation time constants must be appropriate for laser sintering processing and for particle coating operations. All polymers have a set of relaxation time constants that describe their dynamic deformations and internal stresses when they are acted on by external forces. These time constants give a quantitative idea of the rate at which the polymer can flow and creep. Typical dynamic response functions are of the form: (Tobolsky, 1960, incorporated herein by reference)

$$G(t)=\Sigma G_i \exp(-t/\lambda_i)=\int G(\lambda)\exp(-t/\lambda)d\lambda \qquad (1)$$

where $\lambda_i=\eta_0/G_i$ is the time constant for mode i, and $\eta_0$ and $G_i$ are the zero shear viscosity and modulus for mode i, respectively. The time constants must be small enough to allow appropriate coating of particulate and to provide appropriate fusion between powder layers during processing of the coated powder in the few seconds, maximum, that are permitted by laser sintering processes (Nelsen et al., 1993). Low time constants are achieved by reducing the polymer viscosity, $\eta_0$. Polymer melt viscosities are known to decrease with increasing temperature and shear rate and with molecular weight (Tadmore and Gogos, 1979).

Since the shear rates during sintering or in the spray dryer (after droplet formation) are small, the more important polymer specification is its viscosity at a particular temperature. For amorphous polymers, melt viscosity approaches a maximum with temperature near the $T_g$. A similar response occurs near the $T_m$ of semi-crystalline polymers.

The viscosity is known to decrease in an exponential manner with increasing temperature (Tadmor and Gogos, 1979), such as:

$$\eta_0 = A\exp^{(B/T)} \qquad (2)$$

where the parameters A and B in Equation 2 are properties of the particular polymer, and T is the absolute temperature. According to Equation 2, some reduction in time constants can be made by raising the temperature of the polymer. This is done as much as possible in both the coater/dryer and in the laser sintering process itself; however, this approach is limited by water evaporation temperatures in the dryer and in the laser sintering process by the tendency for the entire powder bed to sinter should its temperature rise above $T_g$ or $T_m$.

$\eta_0$ is proportional to the molecular weight raised to the 3.4 power (Graessley et al., 1967). Based on this relationship, the inventors have used a low shear rate capillary rheometer, called a Melt Index Apparatus to measure the melt viscosity through the ASTM D1238 testing protocol. Materials that show extrusion rates, or melt flow index (M.I.), from this apparatus in the range of 1–50 g/10 min at 200° C. and 75 psi extrusion pressure, generally process well in both the spray drying and the SLS™ processes to yield unfired, "green" parts with acceptable bending strengths at least as high as 1300 psi at a binder content of 20%.

Figure 3A:
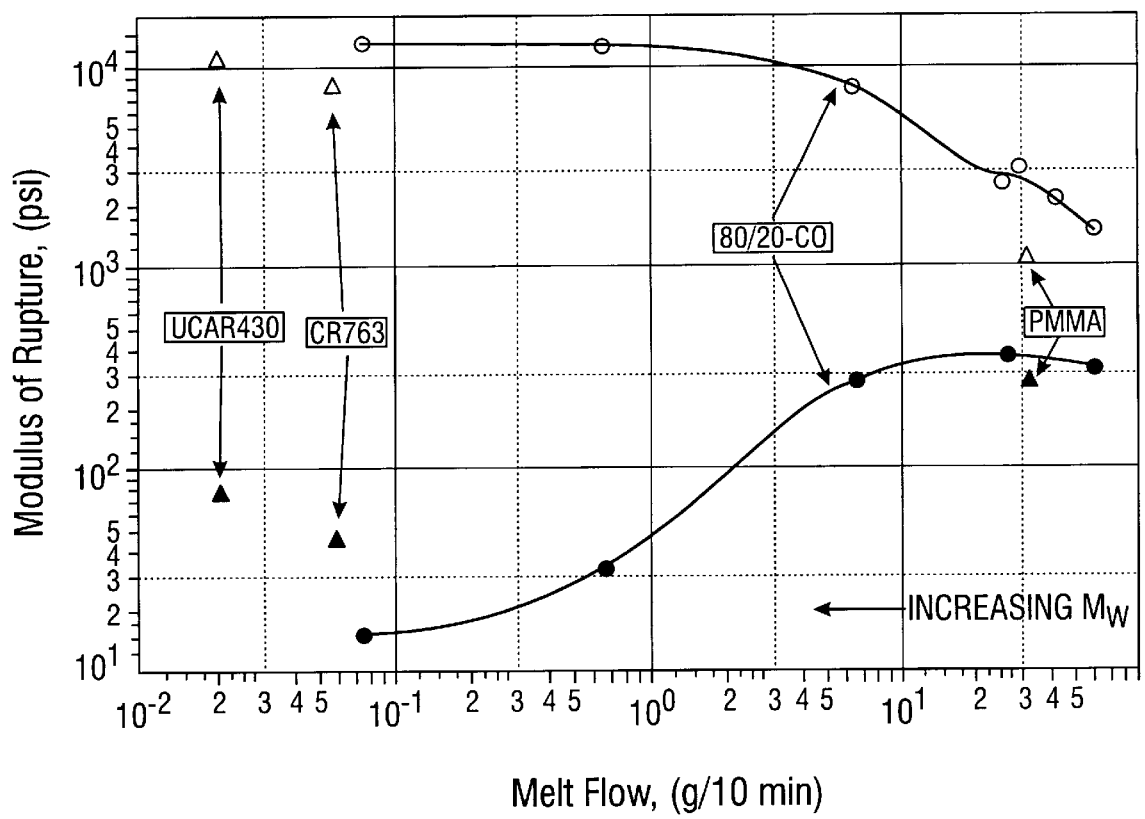
FIG. 3A shows the effect of melt flow on the modulus of rupture (3-point bending) for two commercial polymers and for two polymer compositions of the present invention (PMMA and 80:20 MMA:BMA). Open symbols designate bulk properties of polymers. Closed symbols designate 22 vol % polymer coated glass.
Figure 3B:
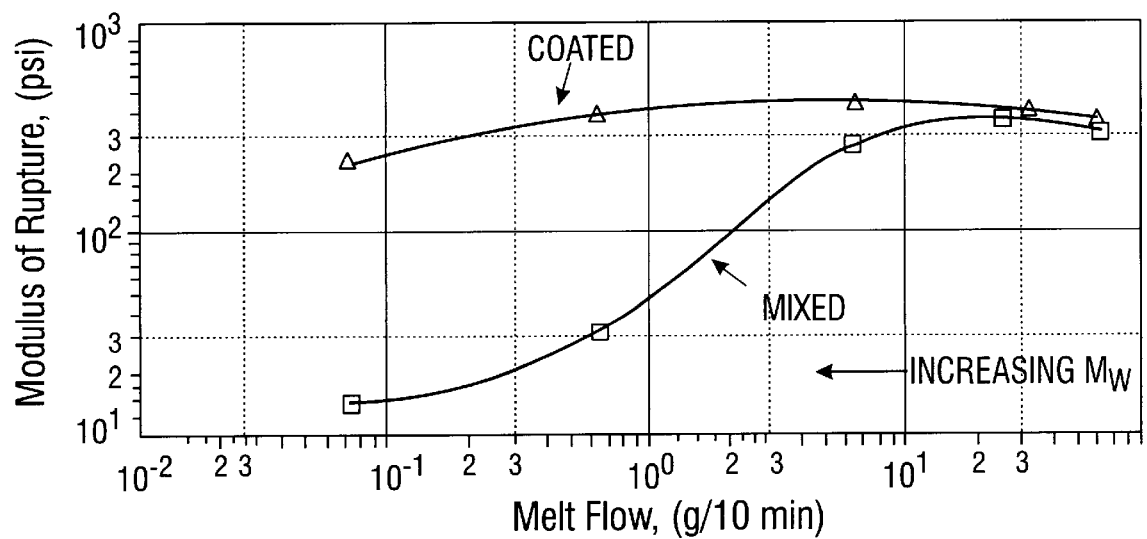
FIG. 3B compares the modulus of rupture (3-point bending strengths) of glass particulates coated with 80/20 P(MMA-co-nBMA) copolymer binder by two different methods: one by mechanically mixing the particulates with the binder and the other by spray coating the binder onto the particles.

FIGS. 3A and 3B show some of the correlations between green part strengths and polymer binder molecular weight or viscosity for a commercial polymer and a methacylate polymer composition prepared as described herein. In FIG. 3A, the materials labeled UCAR 430 and CR763 are high molecular weight, commercial copolymers that contain acrylic monomers. These materials are designed for use in paper coating and other non-flow or low-flow applications. In the pure, cast, state, these materials show bending strengths (3-point bending) near 10,000 psi. Comparable strength in the pure, cast, state is observed for a high molecular weight copolymer, containing 80 mol % methyl methacrylate/20 mol % n-butyl methacrylate, (80MMA/20BMA), prepared by the disclosed methods. Each of the powdered polymers, when mixed with glass particles and formed into bending specimens by baking in molds at 175° C. for 30 min, after a two hour heat-up time, provided green parts with poor bending strengths, i.e., <80 psi MOR. These poor properties were correlated to the poor bending strengths seen for bars processed at typical at SLS™ processing conditions. Reducing the molecular weight of the copolymer binder, using the disclosed methods, decreased the viscosity and time constant, increased melt flow and increased the strength of the composite.

Parts were prepared from composite powders, comprising glass particles mixed with copolymer binder, that were molded as previously described. FIG. 3A shows that green part strength increases with increasing melt flow of the copolymer binder and approaches a maximum, near 300 psi, at the melt flow (or molecular weight) where the strength of the cast pure polymer is falling from its high plateau value. This result is counter-intuitive. Most theories of composites would predict for well adhered systems that strength, $\sigma$, should be additive on a volume fraction weighted basis, that is $$\sigma = \sigma_P^{ult}(\phi_P + \phi_F E_F/E_P) \quad (3)$$

where $\sigma_P$ is the volume fraction polymer, $\phi_P^{ult}$, the ultimate strength of the polymer (the polymer is assumed to fail first in this model), $\phi_F$ the volume fraction of filler, and $E_F/E_P$ is the ratio of filler to polymer moduli (German, R. M., 1990). The composite shown in FIG. 3A, clearly does not follow the conventional expectation embodied in Equation 3. It appears that the reduction in viscosity and related time constant leads to better polymer wetting of the particulate, better adhesion, and higher composite strengths.

FIG. 3B shows a similar comparison between the 3-point bending strengths of specimens that were made from mixtures of PMMA and P(MMA-co-nBMA) copolymer binder with glass particulates and specimens that were prepared from glass particles using spray-coating techniques described previously. For the mixed samples, polymer powder emulsions were mixed with glass particles. Rather than performing the spray coating process previously described, polymer binder produced by spray drying the appropriate latex was mixed with substrate powder. When spray dried, latex polymers yield finely divided, free-flowing particulate, much like powdered milk or instant coffee only much smaller. These powders were sifted through 325 mesh (<45 $\mu$m) screens to remove any large particles. Thorough mixing must be ensured and may never be sufficient as most mixtures will separate on light tapping due to density differences of the powders. As in FIG. 3A, the test bars were prepared by baking the mixed or coated powders in molds at 175° C. for 30 min, after a two hour heat-up time. Bars made from coated powders have clearly superior strengths at the same binder content; i.e., 22 vol %. Maximum strengths for coated materials appear near M.I. of 5–6 g/10 min; however, good strengths are observed over a fairly wide range of M.I. values.

Figure 4A:
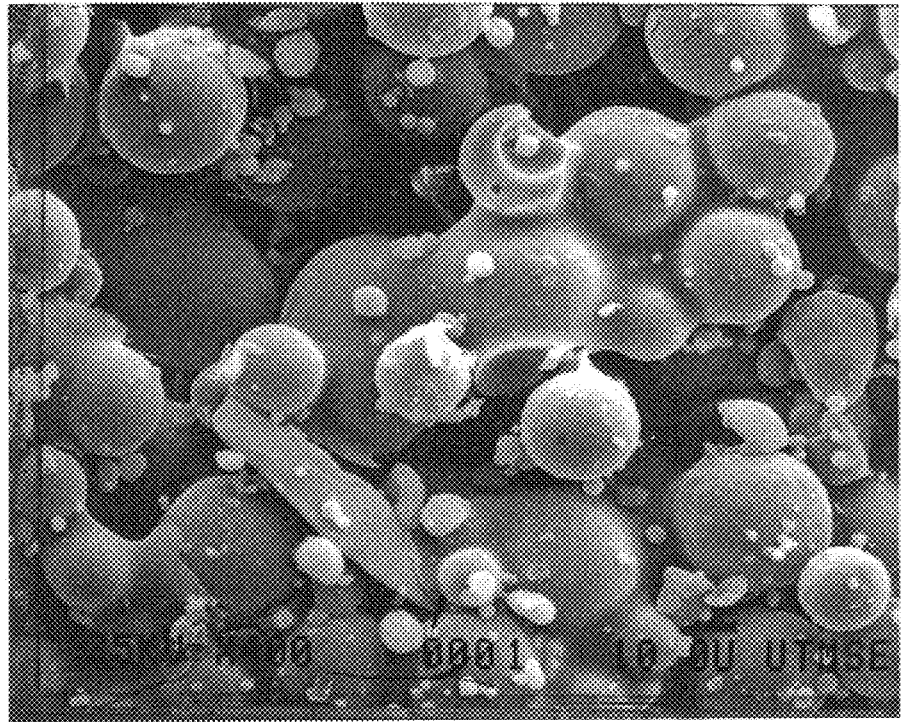
FIG. 4A is a photograph showing fracture surfaces of low molecular weight PMMA coated glass beads processed by selective laser sintering.
Figure 4B:
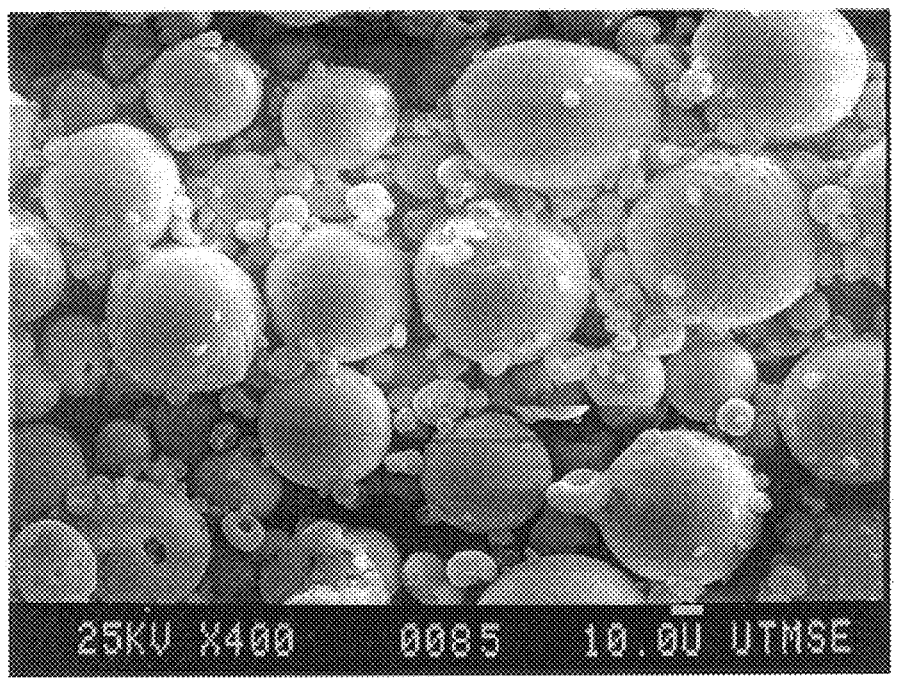
FIG. 4B is a photograph showing fracture surfaces of high molecular weight UCAR 430 coated glass beads processed by selective laser sintering at 20 W laser power and 75 ips scan speed.

Generally, the parts made by SLS™ from binder-coated inorganic powders have strengths close to those made by the oven-baking method. The binder M.I. for optimum strength using SLS™ is generally in the range 5–30 g/10 min. Fracture surfaces of SLS™ parts made from glass beads coated with PMMA were compared. Samples of the desired low viscosity and the less desired high viscosity UCAR 430 material (M.I. <0.5 g/10 min) are shown in FIG. 4. Under the action of the laser beam, the lower molecular weight material has clearly formed a semi-continuous film, binding the glass particles, while the UCAR 430 polymer has not formed films. These differences may be responsible for the mechanical behavior shown in FIG. 3A.

Polymer viscosities in the range where the highest composite strengths are observed are up to five times lower than typical values for polymers used for injection molding. As discussed, emulsion polymerization is preferred for preparing water dispersible, water insoluble polymers. Unfortunately, this process tends to produce very high molecular weight products that are unsuitable as binders for the laser sintering processes. To achieve the desired lower viscosity materials, the inventors incorporated appropriate chain transfer agents in the polymerizing system. The present invention includes methods of selecting chain transfer agents and methods of mixing these agents in the reacting emulsion to produce materials with appropriate molecular weights and viscosities for selective laser sintering and related coating processes.

Binders must "burn out" cleanly to yield low ash ceramic and metal parts. Most organic polymer binders will oxidize to carbon dioxide and water in the high temperature, air containing, furnaces that are normally used to "fire" or sinter ceramics. Thus almost any polymeric binder may be used for binding metal powders, provided that the furnace is operated first under oxidizing conditions to oxidize the polymer, followed by reducing conditions to reduce the metal oxides formed during the oxidation step. This approach, or some variant of it, is generally used when removing polypropylene or polyethylene and wax binders from green parts made by powder injection molding. The problem with this approach is that extra furnace processing time is required to reduce the metal oxides. More importantly, some metal powder parts will swell due to oxide formation, leading to unexpected changes in part dimensions.

The novel binders developed by the inventors solve this problem because they decompose to gaseous products in a reducing atmosphere such as hydrogen. Generally speaking, when oxidizing agents such as oxygen are not present, the high temperature decomposition paths are limited to three types of reaction; (i) sequential elimination of chemical side groups in the polymer chain; (ii) random scission of the polymer chain; and (iii) depolymerization of the chain to form monomer. The first two paths invariably form graphitic carbon structures as the non-carbon species comprising the molecule are thermally stripped from the polymer backbone. Polymers that decompose by these paths leave behind an undesirable "ash" or conjugated carbon contaminant in the metal structure that can cause losses in mechanical properties of the sintered part.

The third decomposition route, depolymerization, largely eliminates the ash problem because the polymer simply reverts to monomer at temperatures below those required for substantial thermal scission and degradation. Polymers that have a quaternary carbon atom alternately located in their backbones are known to depolymerize when heated (Stevens, 1990; Densinov, 1982). Typical such polymers include (poly)methylstyrene and polymers, copolymers, terpolymers comprising methacrylic acid and the like.

The inventors have found that suitable polymer binder compositions need not be entirely comprised of polymers that decompose by depolymerization. Small amounts of chemically similar comonomers and termonomers that do not have the requisite structure for thermal depolymerization may be included to enhance adhesion, and to provide other desirable properties, provided that these monomers comprise less than 5 mole % of the copolymer composition.

Figure 5:
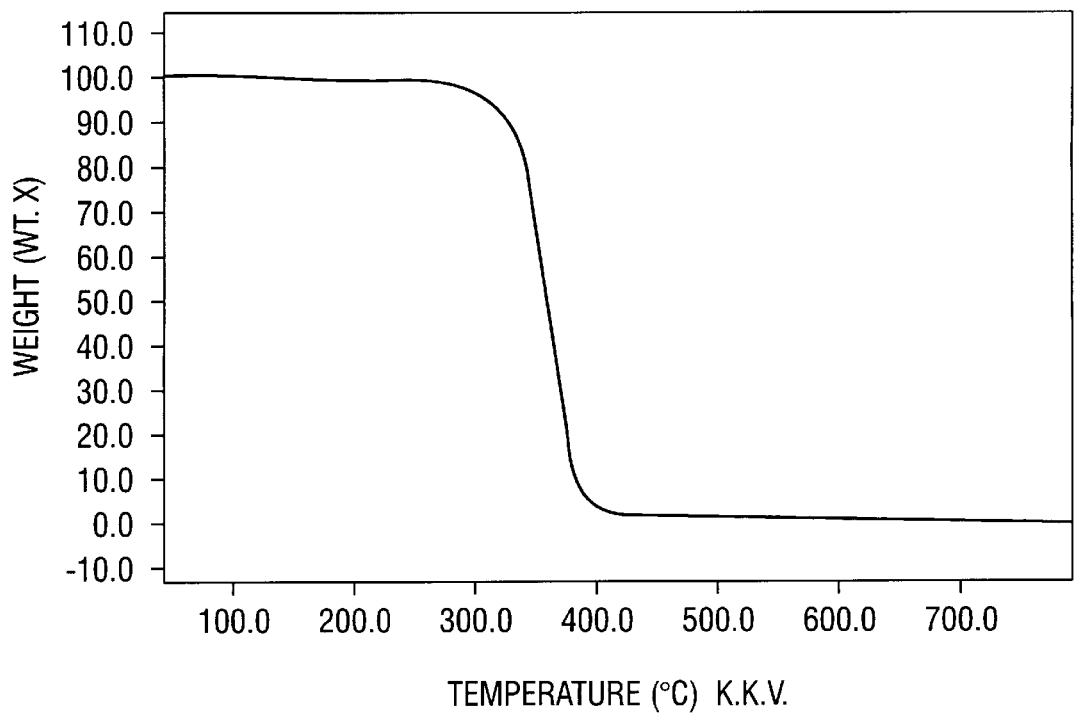
FIG. 5 is a thermogravimetric decomposition curve of an 80/20 P(MMA-co-nBMA) copolymer binder prepared by the disclosed methods.

Thermal decomposition analysis of the inventors' polymer systems indicates that the polymer decomposes fully in a non-oxidizing environment. FIG. 5 shows a trace from a Perkin-Elmer (Norwalk, Conn.) Series 7 Thermogravimetric Analyzer, TGA, of a 80/20 P(MMA-co-nBMA copolymer binder. The trace indicates that the binder decomposes completely, leaving less than 0.5 wt % residue. The residue generally arises from suspension aids and emulsifiers used to prepare the polymer binder. The decomposition process begins near 275° C. and is completed near 400° C. when the copolymer is heated at 10° C./min in nitrogen.

A related benefit to the use of materials that unzipper or depolymerize to monomer is that during debonding the molecular weight of the polymer that remains is substantially constant and unchanged from the original value. This is a due to the lack of random chain scission. Consequently, the mechanical and rheological properties of the non-evaporated polymer remain constant during the unzippering process.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Materials and Methods

The SLS™ machine used for this work is model #125 (DTM Corp, Austin, Tex.).

Methylmethacrylate (MMA) and n-butylmethacrylate (nBMA) (Aldrich Chemical Co.) monomers were prepared by washing three times with 5M NaOH at a volume ratio of 5:1, monomer to caustic respectively. Washed monomers were chilled to −4° C. to freeze residual water, filtered and stored at 4° C.

Potassium persulfate initiator (Aldrich Chemical Co. Milwaukee, Wis.) and electrophoresis grade sodium dodecyl sulfate (SDS) emulsifier (Kodak Chemical Co., Rochester, N.Y.) were used as supplied. Chain transfer agents thiophenol (THP) and t-dodecylmercaptan (t-DDM) were obtained from Aldrich Chemical Co. Additional chain transfer agents iso-octyl-3-mercaptopropionate (i-OMP) and n-butyl-3-mercaptoproprionate (n-BMP), (Pfaltz and Bauer Chemical Co., Waterbury, Conn.). All chain transfer agents were used as received. Filtered and deoxygenated water was used in all polymerizations.

EXAMPLE 1

Two synthesis methods, batch and semi-batch have been developed by the inventors for preparing copolymers and terpolymers of methacrylic acid esters. Both procedures react substantially all (>99.5%) of the monomer and provide polymer binder compositions that may be used to coat metal or ceramic particles useful in producing green parts laser sintering processes. Green parts produced by such sintering processes are readily converted to all-metal or all-ceramic prototype parts by thermally decomposing the binder.

Preparation of Polymer Emulsions
Batch Copolymerization

A batch polymerization was used to prepare an 80/20 P(MMA-co-nBMA) molar composition copolymer with a melt flow index of 25 grams/10 minutes at 200° C. and 75 psi extrusion pressure and a glass transition temperature near 88° C. A typical list of ingredients used to prepare the 80/20 P(MMA-co-nBMA) molar composition copolymer is provided in Table 1.

TABLE 1

Batch Copolymerization Recipe for Preparing a 80 MMA/20 BMA Copolymer with $T_g$ = 87.5° C. and M.I. = 25 g/10 min.

| Ingredient | g/100 g water |
|---|---|
| Methyl Methacrylate (MMA) | 49.20 |
| n-Butyl Methacrylate (nBMA) | 17.47 |
| i-Octyl-3-Mercaptopropionate (i-OMP) | 0.8049 |
| Sodium Bicarbonate | 0.100 |
| Sodium Dodecyl Sulfate (SDS) | 1.000 |
| Potassium Persulfate | 0.500 |

The recipe shown in Table 1 is written in mass fractions relative to the mass of water used in the reactor. SDS is a standard soap emulsifier, commonly used in emulsion polymerizations. Potassium persulfate is a standard anionic initiator, commonly used in emulsion polymerizations of vinyl monomers. Sodium bicarbonate is a buffer. The concentrations of both the emulsifier and the initiator affect the polymerization rate and DP of the polymer. Numerous experiments showed that for the homopolymerizations of MMA and nBMA in emulsion $$DP_{PMMA}=\alpha[E]^{0.45}[I]^{-0.52} \quad (4)$$

$$DP_{PBMA}=\alpha[E]^{0.28}[I]^{-0.35} \quad (5)$$

where $DP_{PMMA}$ and $DP_{PBMA}$ are the degree of polymerization for poly(methyl methacrylate) and poly(butyl methacrylate), respectively, and [E] and [I] are the molar concentrations of emulsifier and initiator, respectively. These equations indicate that deviations in [E] and [I] from the recipe given in Table 1 lead to predictable changes in polymer melt viscosity.

The emulsifier and buffer were dissolved in 75% of the water to be used. This solution was transferred to the reaction vessel, heated, and maintained at 50° C. The reaction vessel employed was a 500 ml 3-necked round bottom flask equipped with a 2 inch half-moon stirrer connected to a stainless steel shaft attached to a variable speed motor, a condenser, nitrogen and thermocouple inlets, and a glass sampling tube. The reaction vessel was immersed in a constant temperature water bath equipped with an agitator, water inlet, and a temperature controller capable of maintaining a constant temperature to within ±0.5° C. The emulsifier and buffer solution was stirred at 20–30 RPM and purged with nitrogen for at least 15 minutes to remove dissolved oxygen that could interfere with the polymerization.

Monomers were prepared according to the procedure outlined in the Materials section. Following sufficient chilling, the monomers were decanted, filtered and weighed. A mixture containing the MMA and nBMA monomers and the chain transfer agent was prepared and purged with nitrogen for 15 minutes. The monomer mixture was then added to the reaction vessel, stirring was increased to 60–80 RPM, and the mixture was emulsified, purged with nitrogen, and heated for no more than 15 minutes. During this time, the initiator was dissolved in the remaining portion of oxygen-free water and brought to temperature by immersion in the water bath. The initiator solution was then added to the reaction vessel and the polymerization carried out for a time sufficient to ensure complete conversion, typically no more than 30 minutes.

Nitrogen purge was maintained for the duration of the reaction. About 20–25 minutes after the addition of the initiator solution, a vigorous exotherm occurred. At the end of the reaction period, the stirring rate was reduced to 20 RPM to reduce foaming, and stirring and temperature were maintained for an additional 30 minutes to ensure complete conversion of the monomer. The reaction heat was then shut off, and the reaction vessel contents cooled, with slow stirring, to room temperature. The emulsion was then filtered through glass wool to remove any large coagulum that may have been generated.

Figure 7:
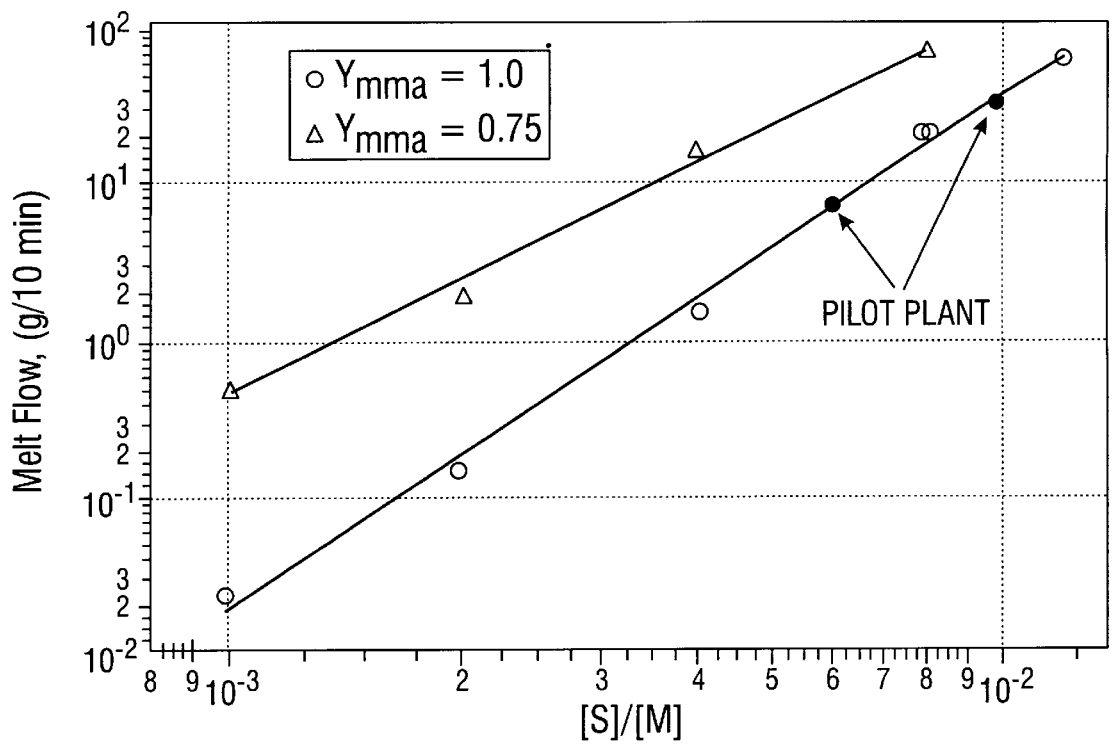
FIG. 7 shows the effect of chain length on the melt flow index of PMMA and P(MMA-co-nBMA) (75/25 mole fraction in feed), measured at 200° C. and 75 psi (0.52 MPa).

For analysis, the polymer was precipitated with acetone, rinsed several times with deionized water, and filtered. The resulting cake was spread on an aluminum sheet and dried under vacuum. The copolymer thus prepared was analyzed by conventional melt flow and molecular weight analysis as shown in FIG. 7.

Semi-Batch Copolymerization

A recipe for producing a 80/20 P(MMA-co-nBMA) molar composition copolymer with a melt flow index of 25 grams/10 minutes at 200° C. and 75 psi extrusion pressure and a glass transition temperature near 88° C. by a semi-batch process is shown in Table 2.

TABLE 2

Semi-batch Copolymerization Recipe for Preparing a 80 MMA/20 BMA Copolymer with $T_g$ = 87.5° C. and M.I. = 25 g/10 min.

| Ingredient | g/100 g water |
| --- | --- |
| Methyl Methacrylate (MMA) | 49.20 |
| n-Butyl Methacrylate (nBMA) | 17.47 |
| i-Octyl-3-Mercaptopropionate (i-OMP) | 0.8049 |
| Sodium Bicarbonate | 0.100 |
| Sodium Dodecyl Sulfate | 1.000 |
| Potassium Persulfate | 0.500 |

The recipe is similar to that used for the batch polymerization shown in Table 1. However, a lower amount of chain transfer agent is used, and thus the [S]/[M] ratio is lower because the semi-batch process produces lower viscosity materials than does the batch process for the same [S]/[M] ratio.

In the semi-batch process, all of the buffer, emulsifier, initiator, and water were charged to the reaction vessel, heated to 50° C., stirred at 20–30 RPM, and purged with nitrogen for at least 15 minutes. The mixture of MMA and nBMA monomers and the chain transfer agent was prepared and purged with nitrogen for at least 15 minutes. The stirring rate was increased to 60–80 RPM and 20% of the mass of the mixture containing the monomers and chain transfer agent was added to the reaction vessel. Full conversion of this monomer mixture occurred after 30 minutes, although the reaction exotherm was less than in the batch process in Table 1 because of the lower content of reacting monomers. After reacting for 30 minutes, the stirring rate was reduced to avoid foaming, and the remainder of the nitrogen-purged monomer mixture was slowly charged to the reactor over a period of 1 hour. The reaction mixture was then held at constant temperature for 30 minutes to ensure complete conversion, allowed to cool, and then filtered, washed, and analyzed as in batch process.

EXAMPLE 2

This example further illustrates the preparation of the polymer binder compositions, but on a large scale using a pilot plant 5 gallon reactor, rather than bench scale 500 ml reactor.

Large Scale Polymerization

Batch and semi-batch copolymerizations were conducted on a large scale (about 10 liters total reaction volume) using a pilot plant 5 gallon reactor. The conditions were essentially the same as given for the laboratory scale provided in Example 1.

The material preparations were similar to those described for the batch polymerization of MMA except for the considerations for nBMA described in Example 1. The standard latex was an 80/20 P(MMA-co-nBMA) copolymer that has a $T_g$ of ~90° C. For either batch polymerization or semi-batch polymerization, the following relations define the quantities of material to be used:

$$m_W = \left(\frac{1-x_p}{x_p}\right) m_M \tag{6}$$

$$m_{MMA} = 0.738 m_M$$

$$m_{nBMA} = 0.262 m_M$$

$$m_E = m_W \frac{1.0 \text{ g}}{100 \text{ g H}_2\text{O}}$$

$$m_I = m_W \frac{0.5 \text{ g}}{100 \text{ g H}_2\text{O}}$$

$$m_B = m_W \frac{0.1 \text{ g}}{100 \text{ g H}_2\text{O}}$$

where $m_{MMA}$ is the mass of methylmethacrylate monomer, $m_{nBMA}$ is the mass of n-butylmethacrylate, $x_p$ is the mass fraction of polymer solids desired (typically less than 0.45), $m_w$ is the amount of water, $m_I$ is the amount of potassium persulfate initiator, $m_g$ is 5 the amount of sodium dodecyl sulfate emulsifier, and $m_B$ is the amount of sodium bicarbonate buffer.

For batch polymerization the amount of chain transfer agent (i-omp) was determined using the following relations:

$$\frac{[S]}{[M]} = \left(\frac{M.I.}{583.769 \times 10^6}\right)^{\frac{1}{3.32}} \tag{7}$$

$$m_c = 218.361(n_{MMA} + n_{nBMA})\left(\frac{[S]}{[M]}\right)$$

$$n_{MMA} = \frac{m_{MMA}}{100.12}$$

$$n_{nBMA} = \frac{m_{nBMA}}{142.20}$$

where M.I. is the melt flow index of the copolymer in g/10 min as determined at 200° C. and 75 psi, $m_c$ is the mass of chain transfer agent (i-omp), $n_{MMA}$ and $n_{nBMA}$ are the molar quantities of the respective monomers.

In semi-batch polymerization the amount of chain transfer agent (i-omp) was determined from the following relation:

$$\frac{[S]}{[M]} = \left(\frac{M.I.}{386.077 \times 10^6}\right)^{\frac{1}{3.192}} \tag{8}$$

where the symbols are the same as previously defined.

Once the materials are prepared, the method of batch copolymerization is the same as for the batch polymerization of MMA.

For the semi-batch method, the polymerization was first "seeded" by conducting a batch polymerization with 20 wt % of the total monomer feed. The full amount of chain transfer agent was added to the total monomer solution. The seed monomer was then separated from the monomer solution. This procedure is substantially identical to that used in the bench scale semi-batch method described in Example 1.

At the end of the seed preparation, agitation was reduced slightly and the $N_2$ purge maintained. The remaining monomer solution was purged with $N_2$ for 15 minutes. After purging, the flow of monomer was started to the reactor vessel and was adjusted so the time of monomer addition was one (1) hour. The stream of monomer was not be allowed to splash into the reactor contents as this produces small particulate. When monomer addition was complete, the reactor vessel was held at temperature for an additional 30 minutes to complete conversion or when refluxing was no longer observed. Reduce stirring and allow to cool. The latex was filtered with glass wool.

Several copolymerizations, both batch and semi-batch, were conducted on a relatively large scale in a pilot-plant. Results from several runs showed that the inhibitor is not removed after a single caustic washing of nBMA. Indeed, several washings or vacuum distillation were required to remove the inhibitor.

Incomplete inhibitor stripping was manifested as a failure of the polymerization to initiate or, in some cases also as an increase in the amount of coagulum present in the latex. Successful initiation was characterized by a change in color of the reaction mixture from light gray to light blue due to nucleation of polymer particles.

If nucleation did not occur within the first few minutes after addition of the initiator solution, it was necessary to induce initiation of the polymerization. This was done by slowly increasing the bath temperature until nucleation occurred, then immediately lowering the water bath to cool the reaction mixture to normal conditions and allowing the reaction to proceed normally. Once the polymerization was initiated, whether natural or induced, it proceeded normally without problem in either batch mode or semi-batch. Induced initiation did not significantly affect the properties of batch polymerized copolymers as determined from melt flow index.

EXAMPLE 3

The following example illustrates polymerization using a termonomer for copolymerization with methyl methacrylate and n-butylmethacrylate. In general, functional termonomers were satisfactorily copolymerized with semi-batch polymerization. The required amount of termonomer was added to the continuous feed quantity of monomer solution. Several considerations must be noted when termonomers are used.

Too high a termonomer concentration may cause latex instability in the developed recipe. Methacrylic acid concentrations, when employed as the monomer, should not exceed concentrations of more than ~5 wt % of the total monomer feed. Methacrylamide concentrations should not be greater than ~2 wt % of the total monomer feed. The concentration of this monomer is further limited by its solubility in the monomer feed. N,N-dimethylaminoethylmethacrylate should be kept below ~2 wt % of the total monomer feed. Solids content of latexes containing this termonomer should be less than 40 wt %, preferably 30 wt % or less. The termonomer dramatically increases the polymerization rates and produces a noticeable amount of particulate that collects on the paddle. Therefore, care should be taken to ensure adequate control of the monomer feed to ensure the polymerization is kept under control.

Copolymerization Termonomers

A semi-batch process was employed to synthesize terpolymers based on the 80/20 P(MMA-co-nBMA) molar composition copolymer described herein. The termonomers used are listed in Table 3.

TABLE 3

Physical Properties of Termonomers

| Monomer | Mol. Wt. | Density g/ml | B.P. ° C. | Functional group |
|---|---|---|---|---|
| Methacrylamide (MAM) | 85.12 | — | m.p. 110 | —$CONH_2$ |
| N,N-dimethyl-aminoethyl-methacrylate (DMAEMA) | 157.22 | 0.933 | 182–192 | —$N(CH_3)_2$ |
| Methacrylic Acid (MAA) | 86.09 | 1.015 | 163 m.p. 16 | —$CO_2H$ |

The termonomers were selected to introduce small amounts of acidic or basic moieties to the copolymer backbone. This allows the resulting terpolymer to have enhanced adhesion characteristics by increasing acid-base interaction between the functional group on the monomer and the target substrate. Further, these termonomers are 1,1-disubstituted vinyls to maintain the asymmetric backbone chain of the base copolymer and, therefore, will not significantly affect the thermal decomposition characteristics of the binder.

The procedure for synthesizing terpolymers was the same as described in Example 2, except that any one of the termonomers listed in Table 3 was added to the mixture of monomers and chain transfer agent in an amount that did not exceed 2% by weight of the total monomer amount. Below 2% by weight of termonomer in the terpolymer, any termonomer contribution to the melt flow index of the binder was insignificant.

Table 4 lists a typical terpolymer feed recipe used to prepare polymer emulsion compositions suitable for coating ceramic or metal particulates intended for production of green parts by laser sintering processes.

TABLE 4

Terpolymer feed recipe

| | Water (g) | Emulsifier (g) | Initiator (g) | Bicarb (g) |
|---|---|---|---|---|
| | 450 | 4.5 | 2.25 | 0.45 |
| Mass Fraction of Termonomer | MMA (g) | nBMA (g) | Termonomer (g) | i-OMP (g) |
| 0.005 | 220.3 | 78.2 | 1.5 | 3.373 |
| 0.01 | 219.2 | 77.8 | 3.0 | 3.356 |
| 0.02 | 216.9 | 77.1 | 6.0 | 3.322 |
| 0.04 | 212.5 | 75.5 | 12.0 | 3.254 |

Aliquots of the terpolymers were separated from the latex by transferring a small portion of latex (~10 g) to a 250 ml beaker containing an equal amount of water. With rigorous agitation, alternating, equal volumes of acetone and water were incrementally added to diluted latex. The polymer separated as a fine white particulate and the carrier fluid eventually became clear as more acetone/water was added. The mixture was filtered and the filtrate redispersed in an excess of water. Small portions of acetone were added to extract more emulsifier from the polymer. The suspension was again filtered and the process repeated until the redispersed polymer no longer foamed. The polymer was filtered from the suspension and dried in an oven.

Compositional analysis of the nitrogen containing terpolymers was determined by the Kjeldahl method (Galbraith Laboratories, Inc., Knoxville, Tenn. 37921). The acid containing terpolymers were analyzed by titration. Spray dried, finely divided polymer dissolved in a 50/50 vol/vol 2-butanone/2-propanol solution was titrated to a phenolphthalein end-point with 0.005N KOH in 2-propanol. The solvent choices avoid precipitation of the polymer during titration. Solvent blanks were titrated as a reference, yielding ~0.69 meq/l. Titration of a non-acid modified MMA-co-nBMA copolymer yielded negligible acid content. Two solutions of ~4 g of polymer in 100 ml of solvent (5–20 meq/l) were prepared from each terpolymer sample. Three 10 ml volumes from each sample were titrated. This method was verified using a readily available commercial styrene-acrylic acid copolymer (Dow Chemical, Inc.), designated SAA-8, designated to contain 8 wt % acrylic acid (1.11 meq/g polymer). The titration yielded an uncorrected value of 9.0 wt % (1.25 meq/g polymer).

The results of the terpolymer analysis are tabulated in Table 5. The results indicate that the copolymerization yield of the termonomers was quite good with the exception of two samples. In the 4.0% wt. MAM terpolymer, the monomer did not completely solubilize in the monomer feed. Therefore, the amount added to the polymerization is uncertain. The 4.0% wt. DMAEMA terpolymer solidified during polymerization and was not considered.

transfer solvent to monomer and $C_s$ is the chain transfer coefficient for that particular monomer-solvent pair. The literature on chain transfer coefficients for transfer agents suitable for polymerization of methacrylic acid esters and other methacrylic acid derivatives is sparse to non-existent. Many tabulated coefficients are less than 0.01, indicating limited effectiveness in chain termination (Brandrup and Immergut, 1989), while other chain transfer agents are too effective and simply stop the polymerization (Sanayei and O'Driscoll, 1989). Several chain transfer agents were found to be useful in the present invention. Their physical properties are summarized in the following table.

TABLE 6

Summary of Properties of Chain Transfer Agents

| Material | Mol. Wt. | Density g/ml | Boiling Pt. °C. |
|---|---|---|---|
| t-dodecylmercaptan (t-DDM) | 202.4 | 0.859 | 227–248 |
| n-butyl-3-mercaptopropionate (n-BMP) | 162.2 | 1.01 | 101 (12 mm Hg) |
| iso-octyl-3-mercaptopropionate (i-OMP) | 218.4 | 0.963 | 110 (1 mm Hg) |
| thiophenol (THP) | 110.2 | 1.073 | 169 |

A series of solution polymerizations of methyl methacrylate (MMA) and n-butyl methacrylate (BMA) were con-

TABLE 5

Terpolymer functionality analysis

| Polymer | Functionality | Monomer Feed (wt %) | —N-or-COOH Content Calc. (wt %) | Meas. (wt %) |
|---|---|---|---|---|
| 80/20-MAM-n-S | —CONH$_2$ | 0.5 | 0.081 | 0.10 |
|  |  | 1.0 | 0.16 | 0.14 |
|  |  | 2.0 | 0.32 | 0.27 |
|  |  | 4.0 | 0.65 | 0.26 |
| 80/20-DMAEMA-n-S | —CO$_2$(CH$_2$)$_2$—N(CH$_3$)$_2$ | 0.5 | 0.044 | 0.045 |
|  |  | 1.0 | 0.088 | 0.082 |
|  |  | 2.0 | 0.17 | 0.18 |
|  |  | 4.0 | 0.35 | N/A |
| 80/20-MAA-n-S | —COOH | 1.0 | 1.00 | 1.051 |
|  |  | 2.0 | 2.00 | 2.038 |
|  |  | 4.0 | 4.00 | 4.28 |

EXAMPLE 4

The inventors have developed a method of predicting chain transfer constants for emulsion copolymerization from comonomer constituents (Vail et al., 1994). This method allows one to select appropriate components for producing the novel polymeric binder compositions.

Prediction of Chain Transfer Constants for Emulsion Polymerizations

Molecular weight ($M_N$) or, equivalently, degree of polymerization (DP), is related to molecular weight by, $M_N$=DP ($M_O$) where $M_O$, the average molecular weight of a mer unit, is primarily controlled by the type and concentration of chain transfer agent. According to well-known theory (Bovey, et al, 1955), DP is reduced by addition of a chain transfer agent by the relationship:

$$\frac{1}{DP} = \frac{1}{DP_o} + C_s[S]/[M] \quad (9)$$

where $DP_O$ is the degree of polymerization in the absence of transfer agent, [S]/[M] is the ratio of concentrations of chain ducted at 70° C. in toluene with AIBN initiator and the chain transfer agents in Table 1 to determine their relative efficiencies for chain transfer. A summary of the chain transfer constants is given in Table 7.

TABLE 7

Summary of Chain Transfer Constants in Solution Polymerizations

| Monomer | Transfer Agent | $C_s$ |
|---|---|---|
| MMA | t-DDM | 0.112 ± 0.014 |
|  | i-OMP | 0.864 ± 0.021 |
|  | n-BMP | 0.543 ± 0.038 |
|  | THP | 4.4 ± 0.13 |
| nBMA | t-DDM | 0.110 ± 0.0005 |
|  | i-OMP | 0.472 ± 0.042 |
|  | n-BMP | 0.275 ± 0.016 |

The chain transfer agent i-OMP was chosen as a preferred agent because of its low toxicity and odor and because of its good effectiveness in reducing molecular weights of both MMA and nBMA monomers. By contrast, t-DDM is not as effective and requires the use of more transfer agent causing residual contamination of the inorganic during binder removal. THP is an extremely effective transfer agent; however, it is highly toxic and requires special handling procedures. It needs to be carefully metered to the reacting system to ensure molecular weight control because it is rapidly consumed by reaction with growing chains.

During the initial stages (5% conversion of monomer) of the emulsion homopolymerizations of MMA and nBMA, the relative effectiveness of i-OMP, see Table 7, is reversed, and $C_s$ increases to 1.56 for BMA polymerization and falls to 0.40 for the emulsion polymerization of MMA. At 20% conversion levels, the i-OMP chain transfer constants for MMA emulsion homopolymerization are higher (0.97) than for the emulsion homopolymerization of BMA (0.64). This result is reproducible.

Based on these observations, the inventors developed a method of predicting the effective chain transfer constant for the emulsion copolymerization from those for the comonomer constituents using the following equation:

$$\frac{1}{v} = \frac{1}{v_o} + \left[\frac{C_{s1}r_1x_1 + C_{s2}r_2x_2}{r_1x_1^2 + 2x_1x_2 + r_2x_2^2}\right] \frac{[S]}{[M_1] + [M_2]} \quad (10)$$

where the subscripts 1 and 2 denote the two monomeric species, [S] is the molar concentration of chain transfer agent; [M$_1$] is the molar concentration of monomer 1; x$_1$ is the mole fraction of monomer 1 in the overall system; r$_1$ is the relative reactivity ratio of monomer 1; C$_{s1}$ is the chain transfer constant for monomer 1; variables for monomer 2 are similarly defined; v$_O$ is the kinetic average chain length of the copolymer in the absence of transfer agent; and v is the chain length in the presence of transfer agent.

Figure 6:
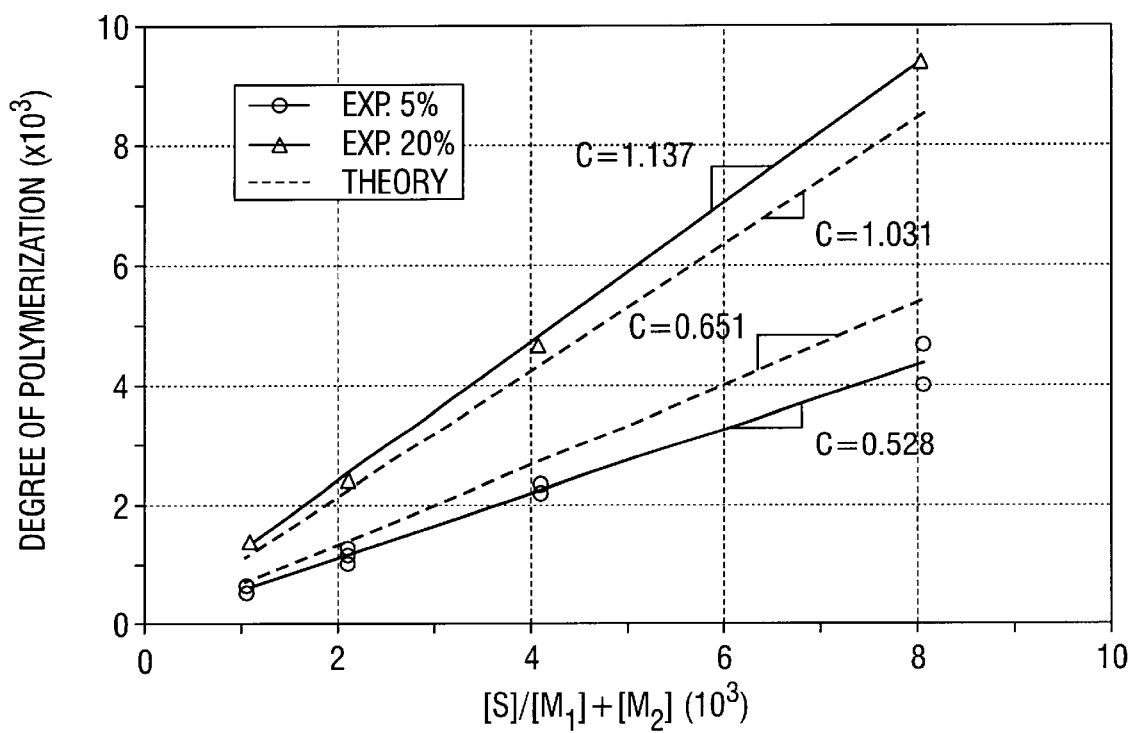
FIG. 6 shows the effect of the chain transfer constant, $C_s$, for i-OMP on the emulsion copolymerization of MMA/nBMA (solid lines). The theoretical values are shown for comparison (dotted lines) at 5% and 20% conversion levels. Molar feed ratio was 75/25 (MMA/nBMA).

A comparison between theory and practice can be seen in FIG. 6 for a copolymer with a 75 MMA/25 BMA molar feed ratio, r$_1$=0.758, r$_2$=0.846, and the C$_s$ values for the emulsion homopolymerizations of MMA and nBMA. Generally, the calculated and observed transfer constants for the emulsion copolymerization agree within 20% at both 5% and 20% conversion levels.

The kinetic average chain length and degree of polymerization (DP), (Equation 9) are related by a constant that is related to the termination mode. Melt viscosity is usually calculated as proportional to the 3.4 power of molecular weight; however, the inventors have found that for PMMA and 75 MMA/25 nBMA copolymer, the power is closer to 3.2 when using the chain transfer agent i-OMP where [M]=[M$_1$]+[M$_2$] (FIG. 7). The melt flow is inversely proportional to viscosity so the melt flow can be related to the concentration of chain transfer agent. Similar relationships can be developed for any polymer or copolymer system. Equation 11 provides a convenient means of using feed conditions to obtain polymeric materials with specified melt flow indices. A good correlation is obtained between laboratory-scale emulsion copolymerizations and pilot plant, 20 liter, copolymerizations of MMA/nBMA, see FIG. 7.

$$M.I._{PMMA} = 1.01 \times 10^8 ([S]/[M])^{3.2}$$

$$M.I._{75MMA/25BMA} = 9.41 \times 10^5 ([S]/[M])^{3.2} \quad (11)$$

Figure 8:
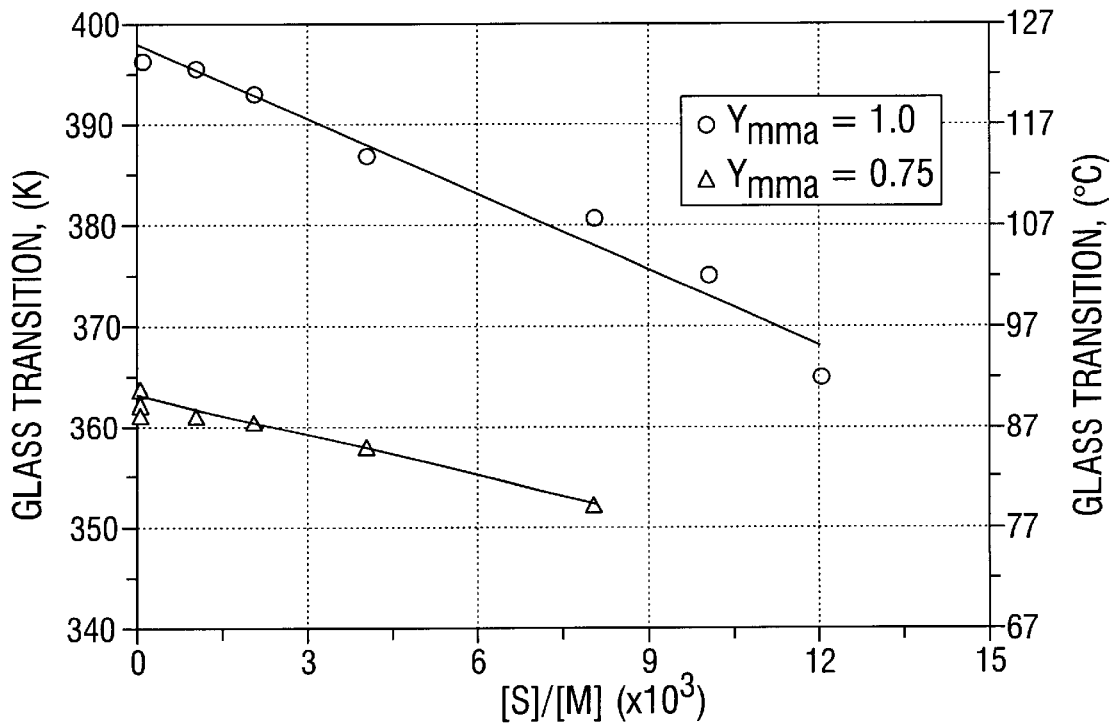
FIG. 8 shows the effect of chain length on the glass transition of PMMA and P(MMA-co-nBMA) (75/25 mole fraction in feed).

The polymer or copolymer glass transition temperature, T$_g$, is known (Wu, 1982) to decrease with number average molecular weight as shown in Equation 12:

$$T_g = T_{g\infty} - \frac{K'}{M_N} = T_{g\infty} - \frac{K''}{M_W} \quad (12)$$

where M$_N$ and M$_W$ are number average and weight average molecular weights, respectively, and are related by a constant for constant polymerization conditions, and T$_{g\infty}$ is the glass transition temperature at infinite molecular weight. Since the molecular weights decrease in linear proportion to an increasing [S]/[M] ration in the polymerization, T$_g$ should decrease linearly with increasing [S]/[M]. FIG. 8 confirms this expectation.

Figure 9:
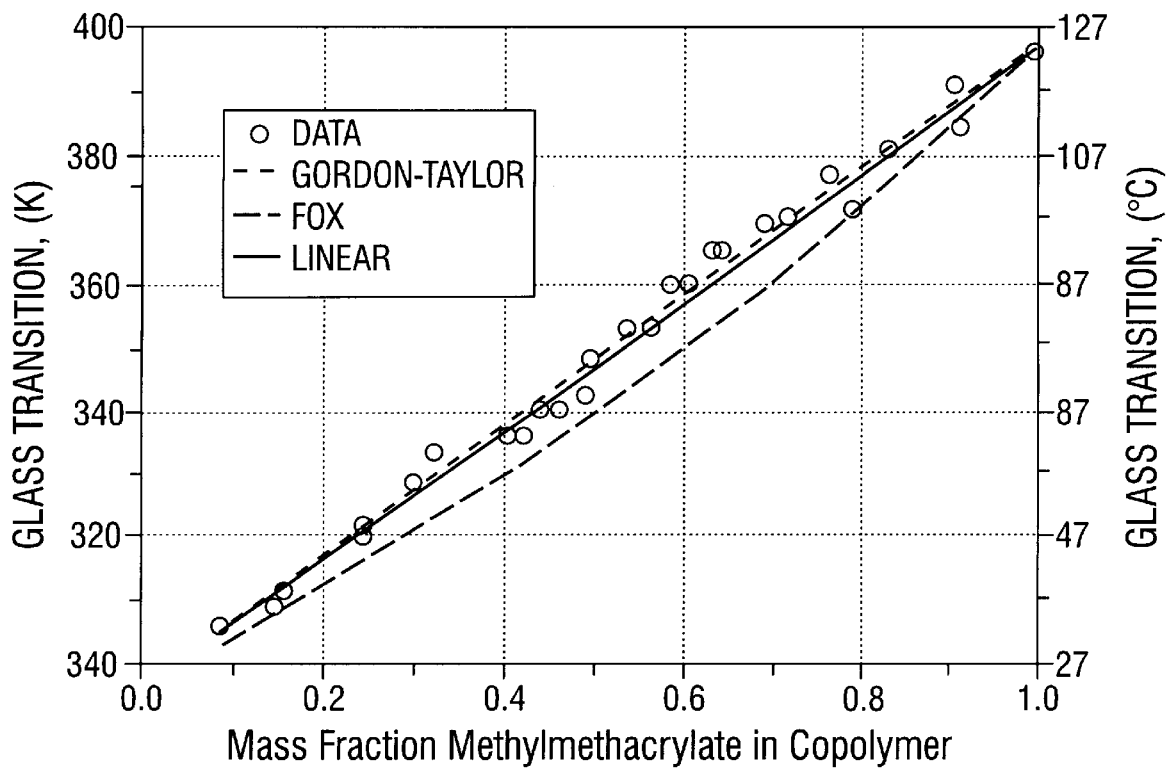
FIG. 9. Comparison of experimental $T_g$s of P(MMA-co-nBMA) high molecular weight copolymers with various predictions. Experimental values for PMMA and P(MMA-co-nBMA); ---Fox; ...Gordon-Taylor; _____ Linear.
Figure 10:
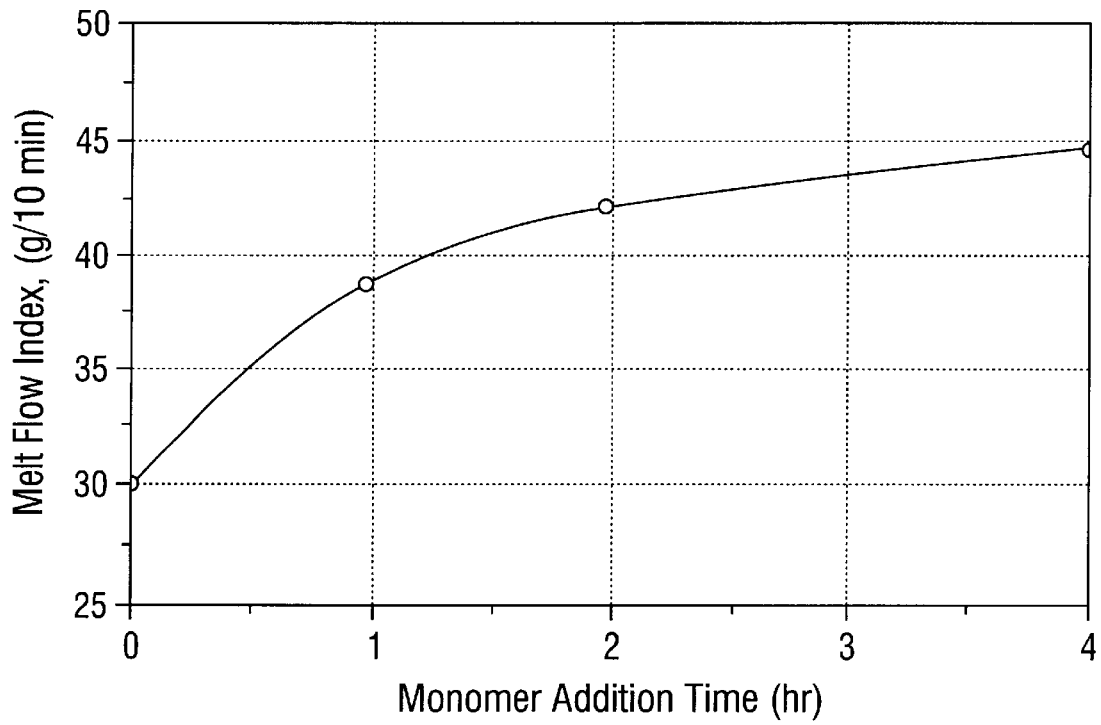
FIG. 10 shows the influence of monomer addition time on the melt flow index of an 80/20 mol/mol PMMA and P(MMA-co-nBMA) emulsion copolymer.

In addition to being a function of molecular weight, the glass transition temperature is also a function of molecular composition, as given by a special case of the Gordon-Taylor Equation (Olabisi, et al, 1979), Equation 13:

$$T_g = \omega_1 T_{g1} + \omega_2 T_{g2} \quad (13)$$

where $\omega_i$ is the mass fraction of component i in the copolymer and T$_{gi}$ is the glass transition temperature for the homopolymer that is formed from component i. FIG. 9 shows that the glass transition temperature of MMA/nBMA copolymers follows Equation 13.

Since the copolymer glass temperature is a function of both the copolymer composition, FIG. 9, and the copolymer molecular weight, FIG. 8, both variables must be considered when developing a copolymer binder that can be employed in selective laser sintering processes. Generally, the molecular weight, or related Melt Flow Index, is set to provide the binder adhesion and flow characteristics needed to give green parts with good strengths. Suitable values of Melt Flow Index range between 1 and 50 g/10 min, with 3–20 g/10 min being preferred for SLS™. The softening temperature should be as high as possible to ensure rapid solidification during SLS™ processing while being at least 10–15° C. below the boiling point of water. An appropriate temperature is 88° C. that, if chosen, suggests that a preferred copolymer would be 80M/20 P(MMA-co-nBMA). Equation 14 was determined from a series of experimental copolymerizations with an 80MMA/20nBMA composition. These equations indicate that a [S]/[M] ratio of 0.006 would be appropriate for use with i-omp.

$$M.I._{80/20} = 5.838 \times 10^8 \left(\frac{[S]}{[M]}\right)^{3.32} \quad (14)$$

$$T_{g80/20} = (367.5) - 1126.9 \left(\frac{[S]}{[M]}\right)$$

where [M]=[M$_1$]+[M$_2$].

EXAMPLE 5

A series of experiments were conducted to study the influence of monomer addition time on the polymer melt flow viscosity of the 80/20 mol/mol MMA/nBMA copolymer system. This series of syntheses used monomer addition times of 0, 1, 2, and 4 hours. Chain transfer agent (i-omp) at a concentration of [S]/[M]=6.374×10$^{-3}$ mol/mol to yield an expected melt flow index of 30 g/10 min at standard measurement conditions was added to the total monomer mixture.

Continuous monomer addition has a dramatic impact on the copolymer melt flow index. Nearly a 30% increase in melt flow occurred with a one hour addition time. The melt flow continued to rise with increased addition times, although not as rapidly, appearing to tend toward a plateau at sufficiently long addition times. This was as expected considering the effect of extended monomer addition on [M] in the polymer particle. During batch polymerization [M] remained essentially constant due to thermodynamic equilibrium until the dispersed monomer phase was depleted. When monomer was added continuously, thermodynamic equilibrium was not achieved because a concentration gradient exists within the particle. As addition time was increased, monomer arriving at the particle surface reacted relatively quickly before diffusing into the particle. As a result, polymerization was localized in a zone close to the particle surface where the [M] was essentially constant throughout the entire polymerization. This yields a reduced molecular weight, a reduced melt viscosity, and an increased melt flow.

Figure 11:
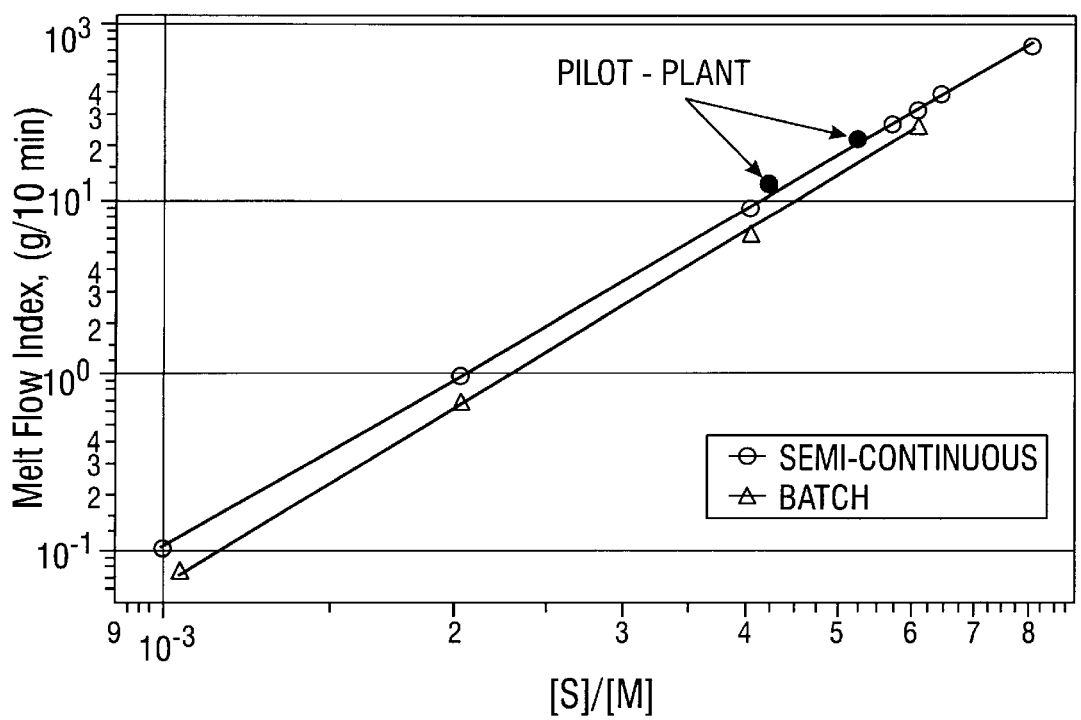
FIG. 11 shows the relation between the melt flow index and the efficiency of the chain transfer agent in terms of [S]/[M] for polymerized copolymers produced by batch and semi-batch processes.

The experiments were repeated using semi-continuous polymerization with a monomer addition time of one hour. The one hour monomer addition time gives the greatest increase in melt flow with least increase in polymerization time. FIG. 11 compares the resulting melt flow indices of the semi-continuous copolymers to the batch copolymers. The shift in the melt flow corresponds to a 10% average decrease in the required chain transfer agent and an increase of 20–40% in the melt flow index over the range of chain transfer agent feed ratios studied. The experimental values shown in FIG. 11 established the melt flow index relationship to the chain transfer agent (i-omp) feed for semi-batch polymerized copolymers as follows:

$$M.I._{Semi_{80/20}} = 386.1 \times 10^6 \left(\frac{[S]}{[M]}\right)^{3.192} \quad (15)$$

Furthermore, FIG. 11 indicates the method of semi-batch monomer addition to work well in syntheses conducted with the pilot-plant 5 gallon reactor.

EXAMPLE 6

The methods used by the inventor to coat inorganic particles are outlined in the following example.

Preparation of Polymer Coated Ceramic Powder

Samples of polymer coated substrates were prepared according to the following equations that determine the amount of each ingredient:

$$m_E = m_s\left(\frac{x_p}{x_E(1-x_p)}\right) \quad (16)$$

$$m_w = \frac{m_s}{x_E x_s(1-x_p)}(x_E(1-x_s+x_s x_p) - x_p x_s) \text{ where}$$

$$X_p = \frac{(\rho_p \phi_p)}{(\rho_p \phi_p + (1-\phi_p)\rho_s)}$$

where $m_E$ is the required amount of latex, $m_s$ the amount of powder to be coated, $m_w$ the amount of water to be added, $x_p$ is the mass fraction of polymer in the resulting sample, $x_E$ the solids mass fraction of the latex polymer, $x_s$ the total solids mass fraction of the final slurry, $\phi_p$ is the mass fraction of the copolymer, $\rho_p$ is the density of the polymer, and $\rho_s$ is the substrate density.

Polymer coated silicon carbide (SiC) containing 25 vol % of an 80/20 P(MMA-co-nBMA) copolymer were prepared. A slurry of 60 wt % solids ($x_s$) was produced from 1000 g of SiC powder and a latex containing 40.21 wt % solids ($x_E$) the requirements were: $m_E$=299.9 g, $m_w$=567.8 g, $x_p$=0.176, $\rho_p$=1.162 g/cm³, and $\rho_s$=3.214 g/cm³. Table 8 shows the actual conditions for this particular spray coating run. The slurry was prepared by first mixing the water and latex followed by the slow addition of powder with continual mixing to give a homogeneous mixture.

TABLE 8

Slurry makeup and spray drying conditions for copolymer coated SiC

| Parameter | Value | Parameter | Value |
|---|---|---|---|
| SiC Powder | 1005 g | Inlet Temperature | 205° C. |
| 80/20 Latex | 303 g | Outlet Temperature | 104° C. |
| Water | 500 g | Atomizer Wheel | Nozzle Type, 45000 rpm |

Polymer content of the spray coated sample was determined by the decomposition of the composite polymer in a Perkin Elmer Series 7 Thermal Gravimetric Analysis (TGA). The sample was heated at 25° C./min from 50° C. to 650° C. in $N_2$. The content was determined as 10.71 wt % (24.91 vol %) from the difference in the sample weights at 100° C. and 600° C. respectively.

Preparation of a Polymer Coated Tool M2 Steel Powder

Suspension of the heavier metal powder is more difficult than the ceramic powder previously described due to the increased density of the powder ($\rho_s$=7.94 g/cm³). Three modifications to the procedure for ceramics were necessary to process the metal powder. First, the solids content of the slurry feed was increased. Second, a viscosity modifier was added to the slurry to further aid suspension. The viscosity of the polymer latex was measured to be about 1 cP, very near the viscosity of water. For equivalent settling times to occur in the metal slurry as in a typical ceramic slurry, the fluid viscosity needs to be 3–5 cP. The increased fluid viscosity was accomplished by the addition of water soluble polymers such as Polyox WSR N-80 and Polyox 6000 (Union Carbide, Corp.) as well as Acacia powder (Aldrich). Typically, 6–12 wt % was required to obtain the desired viscosity. Alternatively, Xanthan Gum (Aldrich) can be used to effect similar viscosities with ~0.2 wt %, a significant reduction of unwanted compounds in the final product. The amount of viscosity modifier was based on total water content of the slurry. Third, the slurry was processed with a slotted atomization wheel rather than a nozzle type. The nozzle wheel utilized in this example (Table 8) has four (4) evenly spaced abrasion resistant nozzles of ~⅛" ID. These small orifices can hinder the free flow of the highly viscous metal slurry feeds. A slotted wheel of hardened steel was fabricated to ease processing of these feeds. The wheel has twelve (12) evenly spaced slots with openings of ~³⁄₁₆"×⁵⁄₁₆". Flow through this wheel was much improved.

To prepare a sample of polymer coated tool steel with ~25 vol % ($x_p$=0.0526, $\rho_p$=1.167 g/cm₃) of an 80/20 P(MMA-co-n-BMA) copolymer containing ~2 wt % basic functionality, Equation 16 was used to determine the amounts of each ingredient. For a basis of 1500 g of steel powder, a latex polymer with 28.44 wt % solids ($x_E$) and a slurry feed solids of 80 wt % ($x_E$): $m_E$=292.8 g and $m_w$=186.3 g. The amount of Xanthan gum required was determined by $$m_x = 0.002(m_E(1-x_E)+m_w) \quad (17)$$

to be 0.79 g. Table 9 shows the makeup for this spray coating run. The slurry was prepared by first making a solution of the Xanthan gum and the water. This step required slight warming of the water to more quickly solubilize the gum, however the temperature was never allowed to exceed 70–80° C. The gum solution was cooled and the latex was added. With continuous stirring the metal powder was slowly added to the gum/latex solution to yield a homogeneous mixture.

TABLE 9

Slurry makeup and spray drying conditions for terpolymer coated M2 Tool Steel Powder

| Parameter | Value | Parameter | Value |
|---|---|---|---|
| M2 Powder | 1500 g | Inlet Temperature | 210° C. |
| Terpolymer Latex | 297 g | Outlet Temperature | 115° C. |
| Water | 184 g | Atomizer Wheel | Slotted Type, 45000 rpm |
| Xanthan Gum | 0.8 g | | |

Polymer content of the spray coated sample was determined by Thermal Gravimetric Analysis (TGA) as 4.70 wt % (22.90 vol %) as previously described. Baseline correction is necessary using pure M2 steel powder to compensate for a small weight gain on heating in nitrogen.

There is no difference between spray coating glass particles and spray coating ceramic particles other than the feed solids may be reduced slightly (Badrinarayan and Barlow, 1992).

EXAMPLE 7

Preparing Green Parts by SLS™

In this example, polymer coated silicon carbide (SiC) powder produced by the spray coating method described in Example 6 was processed by SLS™ to fabricate the desired green shape. The free-flowing polymer coated powder was loaded into the SLS™ machine for processing. The operating environment temperature was biased to heat the powder bed to just below the glass transition temperature, $T_g$, of the binder, ~90° C. In this example this corresponds to a setting of 104° C. on the temperature controller. This controller operates on a temperature feedback signal supplied by an infrared sensor (emissivity=0.90). The sensor indicates the temperature at the powder surface. Overbiasing of the environment temperature is prevented by a thermocouple located just below the surface of the radiant heater. At equilibrium conditions this thermocouple indicates a temperature of ~119° C. These readings are machine dependent as well as material dependent. The powder bed temperature and the operating environment were allowed to equilibrate for at least 1 hr. The environmental atmosphere was maintained semi-inert ($O_2$<8%) by $N_2$ purge.

Sintering of the polymer coated powder was accomplished using a modulated, $CO_2$ laser beam. Representative scanning conditions are listed in Table 10.

TABLE 10

Typical ranges of scanning conditions used for SLS ™ processing of polymer coated SiC

| Parameter | Value Range | Parameter | Value Range |
|---|---|---|---|
| Laser Power | 6–16 Watts | Scan Speed | 50–100 ips |
| Scan Line Spacing | 0.003–0.005 inches | Layer Thickness | 0.0045 inches |

The parameters listed in Table 10, except the layer thickness, are combined to give the applied energy density defined as:

$$A_N = \frac{P}{BS\ SCSP} [=] \frac{cal}{cm^2} \quad (18)$$

where $A_N$ is the Andrew Number, P the laser output power, BS the beam scan speed, and SCSP the scan line spacing. When expressed in the given units this number has values generally less than 10.0 cal/cm². Parts exhibiting green strength are produced with $A_N$>0.5 cal/cm². This lower limit appears to be constant for most material systems. In the SiC powder system the upper limit to $A_N$ of about 3.0 cal/cm². Optimal values are between 1.75–2.5 cal/cm² for the SiC powder system, yielding green parts with fracture strengths of 200–300 psi.

EXAMPLE 8

Testing of Green Strength Using Different Terpolymer Binders

Four polymer systems were synthesized in order to evaluate green strength properties and adhesion characteristics. These polymers were synthesized using semi-batch emulsion polymerization. The properties of the terpolymers are summarized in Table 11.

TABLE 11

Terpolymer Properties

| | | Content (wt %) | | Density | $T_g$, | MOR | Melt Flow, |
|---|---|---|---|---|---|---|---|
| Polymer | Functional group | Theor | Actual | (g/cm³) | (° C.) | (psi) | (g/10 min) |
| PP-14 | None | 0 | 0 | 1.162 | 90 | 4932 | 11.64 |
| PP-15 | —COOH | 4.0 | 4.14 | 1.173 | 98 | 5882 | 4.88 |
| PP-16 | —CONH$_2$ | 2.0 | 1.85 | 1.167 | 92 | 5972 | 6.66 |
| PP-18 | —CCO(CH$_2$)$_2$N(CH$_3$)$_2$ | 2.0 | 1.93 | 1.153 | 91 | 4846 | 7.02 |

The fabricated polymers were spray coated at 25 vol % content onto the powders listed in Table 12.

TABLE 12

Powders used for green strength studies

| Material | Particle Size (μm) | Density (g/cm³) | Surface Chemistry | Polymer Content (wt %) |
|---|---|---|---|---|
| Silicon Carbide | 15 | 3.214 | Slightly Acidic | ~10.8 |
| Silicon Carbide | 4 | 3.214 | Slightly Acidic | ~10.8 |
| Alumina | 15 | 3.98 | Slightly Basic | ~8.9 |
| Silica | <45 | 2.25 | Acidic | ~14.7 |
| Soda-lime Glass | 5 | 2.5 | Acidic | ~13.5 |
| Tool Steel | <20 | 7.0 | Acidic | ~5.3 |

Figure 12:
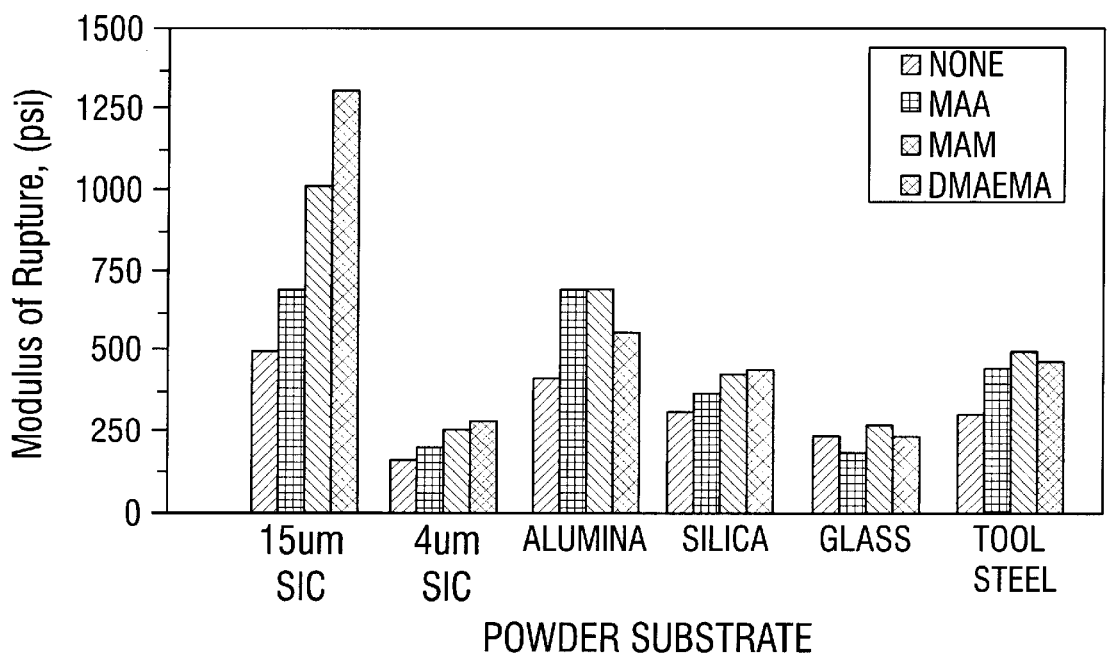
FIG. 12 compares the modulus of rupture (3-Point bend strengths) measured in psi for terpolymer coated metal and ceramic powders.

Standard three-point bend specimens were prepared using an aluminum die mold that was filled with coated powder, settled, and baked in an oven for 30 minutes after a 2 hour heatup time. The results of this test method have been shown to correlate well to the results obtained by selective laser sintering. FIG. 12 shows the green strengths for selected powders and polymers. All the modified copolymers showed increased material green strengths. The increased green strengths appeared to follow the expected acid-base interactions. Green strengths of basic terpolymers were greater on the acidic substrates silicon carbide, glass, and silica. Similarly, the green strength of the acidic terpolymer on the basic alumina was greatly increased over the 80/20 P(MMA-co-nBMA) molar composition base copolymer. However, the basic terpolymers also showed increased green strengths. This may be a consequence of the amphiprotic nature of alumina. Most notable is the dramatic increase in green strengths of the silicon carbide system. The low green strengths exhibited by the glass system is a consequence of the small particle size of the powder substrate employed.

EXAMPLE 9

This example compares strength of "green" parts prepared by SLS™ and laboratory methods (CAST).

A-5000 and A-3000 glass were spheroidized soda-lime glasses with average particle size distributions of 5.0 $\mu$m and 24.0 $\mu$m, respectively. The curves designated CAST in FIG. 14 refer to 3 pt bend specimens fabricated in the laboratory under the following conditions.

Figure 13:
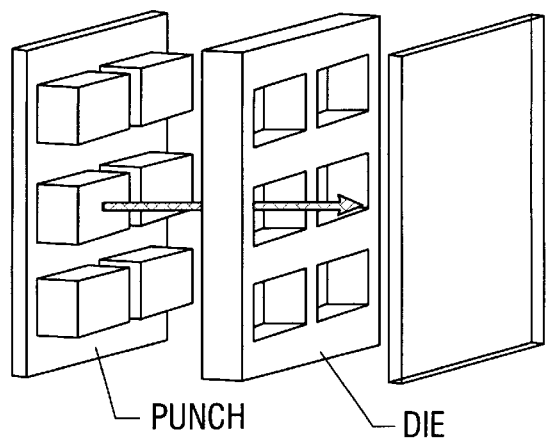
FIG. 13 shows the aluminum die and punch for molding three point bend specimens.

Three point bend specimens were prepared in the laboratory by means of an aluminum mold shown in FIG. 13. The mold consist of a punch and a 8×6×0.75 in. die to which is secured a flat base plate. The die contains six 1×3" cavities for sample shaping. Samples were prepared by first assembling the die and base plate then filling the cavities with equal amounts of material. Sufficient material was added to obtain specimens with ¼" thicknesses; typically about 15 g, depending on material density. The material was settled slightly and the punch inserted slowly into the cavities. Excessive scattering of powder must be avoided to ensure ease of assembly. Once the mold was assembled it was pressed together by hand and placed in a temperature controlled convection oven to 2½ hours at 175° C. A heat up time of ~2 hours was determined by experiment from a thermocouple placed in the powder samples. The soak time at temperature was ~½ hour. Following heating the mold was removed immediately from the oven and placed in a flowing gas stream for rapid cooling. Cooling time was less than one hour. After removal of the base plate, the specimens were pushed out of the mold using the punch. Mold release agent was used to prevent sticking of the specimens to the base plate and the punches but was avoided on the die surfaces.

Figure 14:
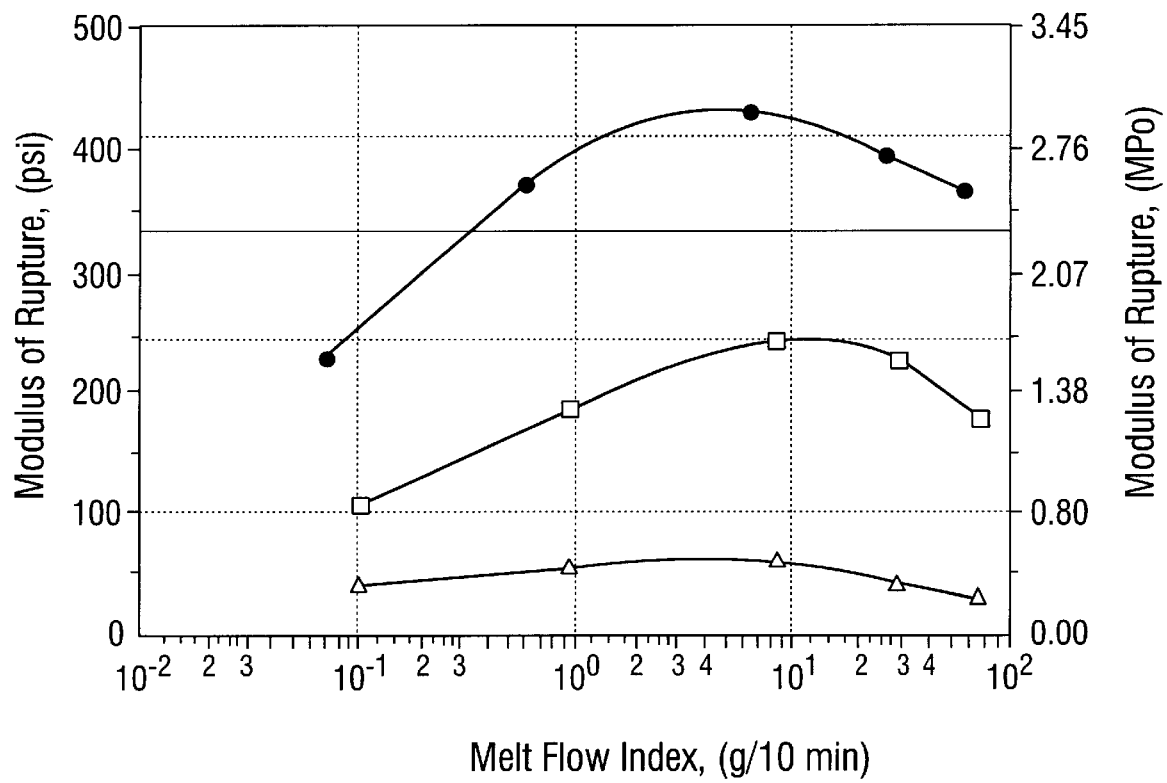
FIG. 14 shows a comparison of green strengths, measured as modulus of rupture in psi (3-point bending strength), as a function of the melt flow index of the polymers employed to coat different particle sizes of soda lime glass.

The SLS™ curve, shown in FIG. 14, refers to green strengths determined from 3 pt test specimens produced by SLS™. The data of this curve represent the maximum green strength achieved from a series of test specimens produced over a broad range of applied energy densities. All curves show the influence of melt flow index and polymer bulk strengths on the green strengths of test specimens. The curves also show the influence of particle size on the green strength. As shown in the CAST curves, it is clear that as particle size increases the green strength increases due to a lower surface to volume ratio. The thickness of the polymer coating is greater in the larger particle case, resulting in increased green strength. Lastly, the SLS™ process is very inefficient with respect to its ability to apply energy to the powder surface, as is apparent by comparing the A-5000 set of curves.

Figure 15:
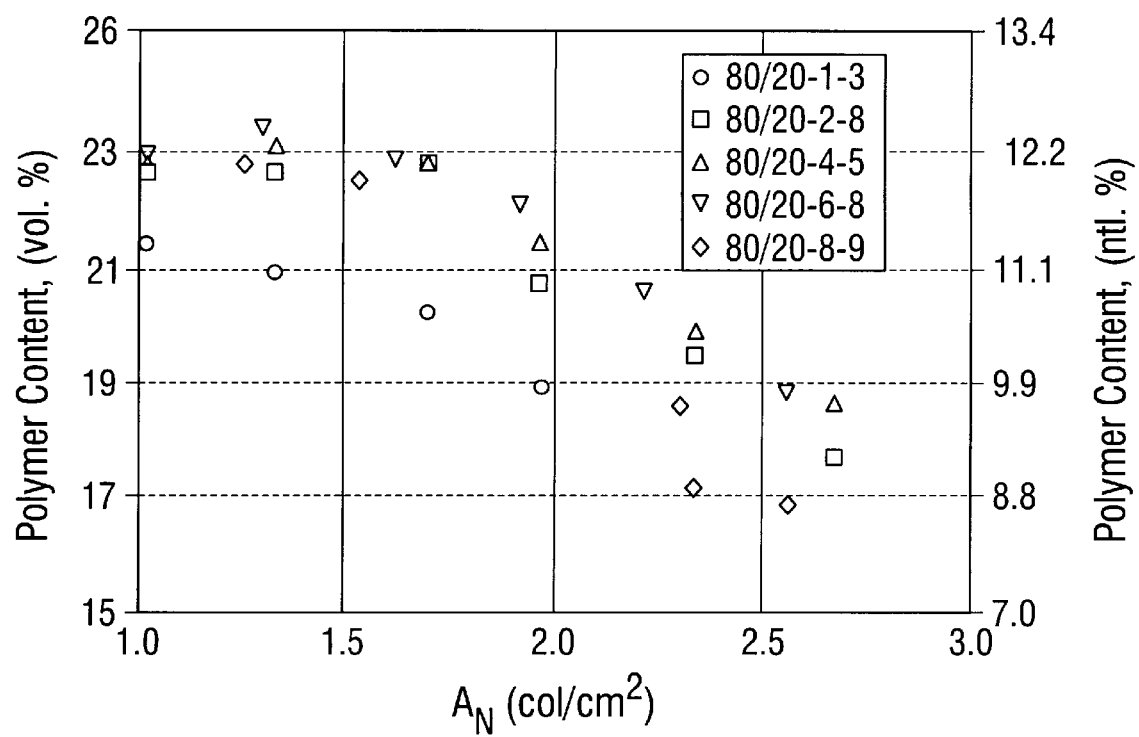
FIG. 15 shows the effect of laser energy density on polymer content of test specimens made from coated A-5000 glass particles with different polymer content.

FIG. 15 shows that, aside from the SLS™ processing being inefficient in delivering energy to the powder surface, local temperatures induced by the laser beam are sufficient to cause degradation of the polymer binder. As the applied energy density is increased binder degradation is also increased, indicating that the development of green strength is a competing process with binder degradation and the latter will eventually win. Unless energy application is optimized, the obtainable green strengths from SLS™ will probably never reach the green strengths obtained under laboratory conditions.

The materials listed in the inset of FIG. 15 refer to a series of semi-batch synthesized MMA/nBMA copolymers with various degrees of melt flow index. The number refers to the amount of chain transfer agent used in the synthesis (×10$^3$). The higher the number the higher the melt flow. These five polymers correspond to the five points on each of the curves of FIG. 14.

While the compositions and methods of this invention have been described in terms of preferred embodiments, it will be apparent to those of skill in the art that variations may be applied to the composition, methods and in the steps or in the sequence of steps of the method described herein without departing from the concept, spirit and scope of the invention. More specifically, it will be apparent that certain agents which are chemically, compositionally and functionally related may be substituted for the agents described herein where the same or similar results would be achieved. All such similar substitutes and modifications apparent to those skilled in the art are deemed to be within the spirit, scope and concept of the invention as defined by the appended claims.

While this method has been described for SLS™, other forming methods can be used.

REFERENCES

The following references to the extent that they provide exemplary procedural or other details supplementary to those set forth herein, are specifically incorporated herein by reference.

Ashley, S., *Mech. Eng.*, 113 [4], 34 (1991).
B. Badrinarayan and J. W. Barlow, "Metal Parts from Selective Laser Sintering of Metal-Polymer Powders," *SFF Symp. Proc.*, 3, 141 (1992).
Bourell, D. L., J. J. Beaman, H. L. Marcus and J. W. Barlow, *Solid Freeform Fabrication Symposium Proceedings*, 1, 1 (1990).
Bovey, F. A., I. M. Kolthoff, A. I. Medalia and E. J. Meehan, *Emulsion Polymerization*, Interscience Publishers, Inc., New York, (1955).
Brandrup, J., and E. H. Immergut, *Polymer Handbook*, 3rd Ed., J. Wiley and Sons, Inc., New York, (1989).
Deckard, C. R., M. S. Thesis, Dept. of Mech. Eng., The University of Texas at Austin, (1986).
Deckard, C. R., Ph.D. Dissertation, Dept. of Mech. Eng., The University of Texas at Austin, (1988).
Densinov, E. T., Chapt. 2 in Scott, G.; Ed.; *Developments in Polymer Stabilization*, Applied Science Publishers: Englewood, N.J., (1982).
German, R. M., *Powder Injection Molding*, Metal Powder Industrial Federation, Princeton, N.J., (1990).
Graessley, W. W., R. L. Hazleton, L. R. Lindeman, *Trans. Soc. Rheology*, 11, 267, (1967).
Leva, Fluidization, McGraw-Hill, New York, (1959).
Masters, K., *Spray Drying Handbook*, 4th ed., J. Wiley and Sons, New York, (1985).
Nelson, J. C., N. K. Vail, J. W. Barlow, J. J. Beaman, D. L. Dourell, *Solid Freeform Fabrication Symposium Proceedings*, University of Texas, Austin, Tex., 360, (1993).
Olabisi, O., L. M. Robeson and M. T. Shaw, *Polymer—Polymer Miscibility*, Academic Press, New York, (1979).
Sanayei, R. A., and K. F. O'Driscoll, *J. Macro. Sci.—Chem.*, A26 [8], 1137 (1989).
Stevens, M. P., *Polymer Chemistry, an Introduction*, 2nd Ed., Oxford University Press: New York, (1990).
Tadmor, Z., C. G. Gogos; *Principles of Polymer Processing*, Wiley-Interscience, New York, (1979).

Tobolsky, A. V., *Properties and Structures of Polymers*, J. Wiley: New York, Chapt. 3, (1960).

Uruquart, A. W., *Advanced Materials and Processes*, 7, 25, (1991)

Vail, N. K., J. W. Barlow, J. J. Beamann, H. L. Marcus, D. L. Bourell; "Development of a Poly(methyl methacrylate-co-n-butyl methacrylate) Copolymer Binder System," *J. Appl. Polym. Sci.*, 52, 789, (1994).

Vail, N. K., J. W. Barlow; "Effect of Polymer Coatings as Intermediate Binders on Sintering of Ceramic Parts", in Marcus, et al., eds.; *Proceedings of the Solid Freeform Fabrication Symposium*, The University of Texas: Austin, Tex., 195, (1991).

Vanecek, Markvart, and Drbohlav, *Fluidized Bed Drying*, Leonard Hill, London, (1966).

Wu, S., *Polymer Interface and Adhesion*, Marcel Dekker, Inc., New York, (1982).

Zone, G., Y. Wu, N. Tran, I. Lee, D. L. Bourell and H. L. Marcus, *Solid Freeform Fabrication Symposium Proceedings*, 3, 72 (1992).

What is claimed is:

1. An amorphous polymeric binder composition comprising an 80/20 molar ratio p(MMA-co-nBMA) methacrylate copolymer that has at least 95% mer units containing quaternary carbon atoms on the mer backbone wherein said copolymer has a $T_g$ of between about 40° C. and about 100° C., a melt flow index of 20–50 g/10 min and a particle size between about 50–250 nm.

2. An amorphous polymeric binder composition comprising a methacrylate copolymer that has at least 95% mer units containing quaternary carbon atoms on the mer backbone wherein said copolymer has a $T_g$ of between about 40° C. and about 100° C., a melt flow index of 20–50 g/10 min and a particle size between about 50–250 nm and further including about 2–5 mol % of a termonomer adhesion promoter.

3. The amorphous polymeric binder composition of claim 2 wherein the adhesion promoter is methacrylamide, N,N-dimethyl-aminoethyl methacrylate or methacrylic acid.

4. The amorphous polymeric binder composition of claim 2 wherein the adhesion promoter is N,N-dimethyl aminoethyl methacrylate.

5. An amorphous polymeric binder composition comprising a copolymer of methyl methacrylate and n-butylmethacrylate with a $T_g$ of about 80 to about 89° C. and a melt index of about 25 g/10 min at 200° C. and 75 psi extrusion pressure.

6. A polymer binder prepared by continuous addition of a water soluble monomer of methacrylic acid ester and n-butylmethacrylic acid ester to an aqueous emulsion of an ionic initiator and a chain transfer agent wherein said continuous addition promotes formation of a copolymer product having a particle size of about 100 nm and a melt flow index of between 1–50 g/10 min at 200° C. and 75 psi extrusion pressure.

7. An amorphous polymeric binder composition comprising dimethyl amino ethyl methacrylate and methacrylamide or methyl methacrylate and butyl methacrylate copolymer that has at least 95% mer units containing quaternary carbon atoms on the mer backbone wherein said copolymer has a $T_g$ of between about 40° C. and about 100° C., a melt flow index of 20–50 g/10 min and a particle size between about 50–250 nm.

8. A copolymeric methacrylate amorphous binder composition having the following properties:

(a) A $T_g$ of between about 40° C. and about 100° C.;

(b) A melt flow index of between about 1 and about 50 g/10 min at 200° C. and 75 psi extrusion pressure;

(c) thermally depolymerizable to gaseous products in a reducing atmosphere;

(d) alternately placed quaternary carbons on the methacrylate copolymer backbone; and (e) an 80/20 molar ratio p(MMA-co-nBMA) copolymer; and wherein said binder decomposes to less than about 0.5 wt. % residue in a non-oxidizing environment at temperatures between about 275° C. and about 400°.

9. A copolymeric methacrylate amorphous binder composition having the following properties:

(a) A $T_g$ of between about 40° C. and about 100° C.;

(b) A melt flow index of between about 1 and about 50 g/10 min at 200° C. and 75 psi extrusion pressure;

(c) thermally depolymerizable to gaseous products in a reducing atmosphere;

(d) alternately placed quaternary carbons on the methacrylate copolymer backbone; and (e) including about 2–5 mol % of a copolymeric termonomer adhesion promoter; and wherein said binder decomposes to less than about 0.5 wt. % residue in a non-oxidizing environment at temperatures between about 275° C. and about 400°.

10. The amorphous polymeric binder composition of claim 9 wherein the adhesion promoter is methacrylamide, N,N-dimethyl-aminoethyl methacrylate or methacrylic acid.

11. The amorphous polymeric binder composition of claim 9 wherein the adhesion promoter is N,N-dimethyl aminoethyl methacrylate.

12. The amorphous polymeric binder composition of claim 1, wherein said binder is thermally depolymerizable to gaseous products in a reducing atmosphere at temperatures between about 275° C. and about 400° C.

13. The amorphous polymeric binder composition of claim 1, wherein said binder decomposes to less than about 0.5 wt. % residue in a non-oxidizing environment at temperatures between about 275° C. and about 400° C.

14. The amorphous polymeric binder composition of claim 2, wherein said binder is thermally depolymerizable to gaseous products in a reducing atmosphere at temperatures between about 275° C. and about 400° C.

15. The amorphous polymeric binder composition of claim 2, wherein said binder decomposes to less than about 0.5 wt. % residue in a non-oxidizing environment at temperatures between about 275° C. and about 400° C.

16. The amorphous polymeric binder composition of claim 5, wherein said binder is thermally depolymerizable to gaseous products in a reducing atmosphere at temperatures between about 275° C. and about 400° C.

17. The amorphous polymeric binder composition of claim 5, wherein said binder decomposes to less than about 0.5 wt. % residue in a non-oxidizing environment at temperatures between about 275° C. and about 400° C.

18. The amorphous polymeric binder composition of claim 6, wherein said binder is thermally depolymerizable to gaseous products in a reducing atmosphere at temperatures between about 275° C. and about 400° C.

19. The amorphous polymeric binder composition of claim 6, wherein said binder decomposes to less than about 0.5 wt. % residue in a non-oxidizing environment at temperatures between about 275° C. and about 400° C.

20. The amorphous polymeric binder composition of claim 7, wherein said binder is thermally depolymerizable to gaseous products in a reducing atmosphere at temperatures between about 275° C. and about 400° C.

21. The amorphous polymeric binder composition of claim 7, wherein said binder decomposes to less than about 0.5 wt. % residue in a non-oxidizing environment at temperatures between about 275° C. and about 400° C.

* * * * *

UNITED STATES PATENT AND TRADEMARK OFFICE
CERTIFICATE OF CORRECTION

PATENT NO. : 6,048,954
DATED : April 11, 2000
INVENTOR(S) : Joel W. Barlow and Neal K. Vail It is certified that error appears in the above-indentified patent and that said Letters Patent is hereby corrected as shown below:

On the title page, at [73] Assignee, please delete "The University of Texas System Board of Regents", and insert therefor -- Board of Regents, The University of Texas System --.

Signed and Sealed this

Twenty-seventh Day of March, 2001

Attest:

NICHOLAS P. GODICI

Attesting Officer

Acting Director of the United States Patent and Trademark Office